(12) United States Patent
Nakajima

(10) Patent No.: US 7,511,868 B2
(45) Date of Patent: Mar. 31, 2009

(54) MULTI-BEAM LUMINOUS SOURCE APPARATUS, AN OPTICAL SCANNING APPARATUS, AND AN IMAGE FORMATION APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 219 days.

(21) Appl. No.: 11/520,807

(22) Filed: Sep. 14, 2006

(65) Prior Publication Data
US 2007/0058232 A1 Mar. 15, 2007

(30) Foreign Application Priority Data
Sep. 15, 2005 (JP) ............................. 2005-269015

(51) Int. Cl.
*G02B 26/08* (2006.01)
(52) U.S. Cl. ..................................... 359/204
(58) Field of Classification Search ................. 359/204, 359/819, 205; 347/241, 243, 244
See application file for complete search history.

(56) References Cited

U.S. PATENT DOCUMENTS

| 5,936,756 A | 8/1999 | Nakajima |
| 6,091,534 A | 7/2000 | Nakajima |
| 6,236,820 B1 | 5/2001 | Nakazato et al. |
| 6,621,512 B2 | 9/2003 | Nakajima et al. |
| 6,690,404 B2 | 2/2004 | Shimada et al. |
| 6,775,041 B1 | 8/2004 | Nakajima |
| 7,075,688 B2 | 7/2006 | Nakajima |
| 2004/0247242 A1* | 12/2004 | Blasingame et al. .......... 385/35 |
| 2005/0062836 A1 | 3/2005 | Nakajima |
| 2005/0190420 A1 | 9/2005 | Imai et al. |
| 2007/0058232 A1 | 3/2007 | Nakajima |

FOREIGN PATENT DOCUMENTS

| JP | 2000-75227 | 3/2000 |
| JP | 2002/341273 | 11/2002 |
| JP | 2003/211728 | 7/2003 |

OTHER PUBLICATIONS

U.S. Appl. No. 12/028,446, filed Feb. 8, 2008, Nakamura et al.
U.S. Appl. No. 12/051,404, filed Mar. 19, 2008, Amada et al.

* cited by examiner

*Primary Examiner*—Euncha P Cherry
(74) *Attorney, Agent, or Firm*—Oblon, Spivak, McClelland, Maier & Neustadt, P.C.

(57) ABSTRACT

A multi-beam luminous source apparatus, an optical scanning apparatus, and an image formation apparatus are provided. The multi-beam luminous source includes a first member for supporting a coupling lens and a second member for supporting a control substrate that supports a Vertical Cavity Surface Emitting Laser (VCSEL). The first member and the second member are joined with a screw at a reference plane that perpendicularly intersects an optical axis of the coupling lens. The second member includes a base member that supports the control substrate and a base member that includes a branch mirror, a convergent lens, and an optical detection sensor.

22 Claims, 18 Drawing Sheets

FIG.7
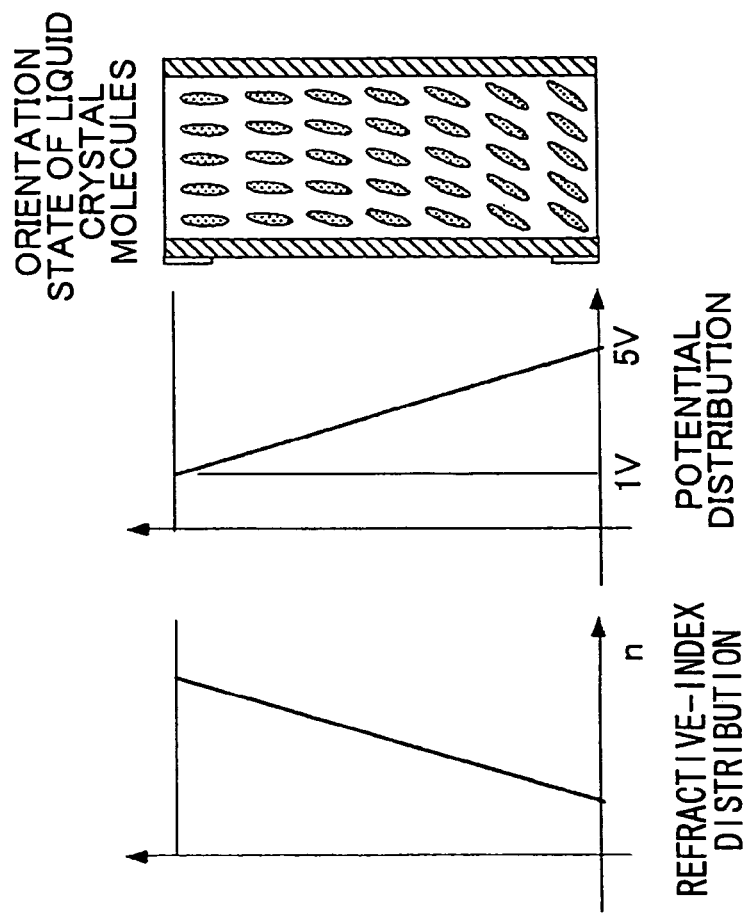
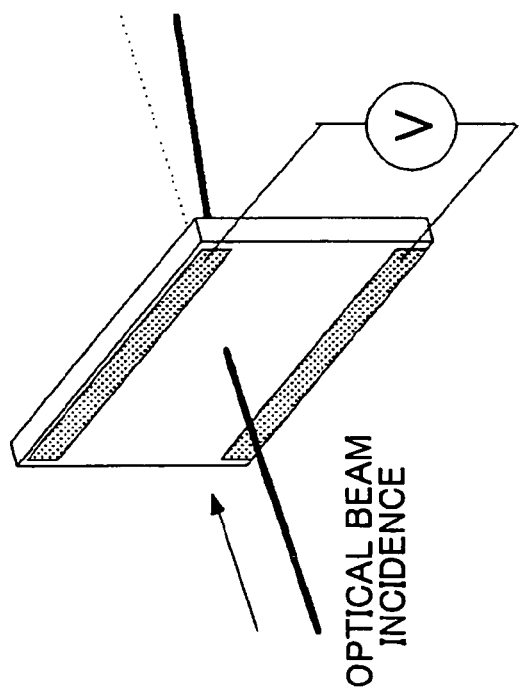

MULTI-BEAM LUMINOUS SOURCE APPARATUS, AN OPTICAL SCANNING APPARATUS, AND AN IMAGE FORMATION APPARATUS

BACKGROUND OF THE INVENTION

1. Field of the Invention

The present invention generally relates to a multi-beam luminous source apparatus, an optical scanning apparatus, and an image formation apparatus; and especially relates to a multi-beam scanner for an optical scanning apparatus used as a writing system of a digital copier, a laser beam printer, and the like, for scanning a surface of a photo conductor and the like simultaneously with two or more optical beams, and for forming an image at high speed.

2. Description of the Related Art

Conventionally, a tandem system multi-color image formation apparatus has been available, wherein photo conductor drums for different colors are arranged along a conveyance route of an imprint object, toner images in corresponding colors are formed at image formation stations of the corresponding colors, and the toner images are superposed to form a color image in one pass. This has contributed to increasing the image formation speed. Recently and continuing, with improvements in the speed, a simple printing with an on-demand printing system is available, wherein high quality image formation with homogeneity of images from print to print is increasingly required.

Further, as a technique of raising the recording speed, there is a method of raising the rotational speed of a polygon mirror for deflecting. However, this method requires higher power consumption, which generates heat that deforms the housing for accommodating an optical scanning apparatus. The deformation causes a displacement of a scanning position on a photo conductor. Examples of the deformation include a registration (toner) error and inclination of a scanning line. For this reason, the rotational speed of the polygon mirror cannot be raised too much if the homogeneity of the quality of image from print to print is to be maintained.

On the other hand, there is a multi-beam scanner for raising the recording speed, hence raising the speed of the optical scanning apparatus. The multi-beam scanner scans a surface of a scanning object with two or more beams such that two or more adjoining lines are simultaneously recorded. In this way, the speed is raised without raising the rotational speed of the polygon mirror.

Here, if the rotational speed of the polygon scanner is R (rpm), the moving speed of an imprint object is V (mm/s), the number of planes is N, recording density is D (dpi), and the number of luminous sources is m, the rotational frequency R of the polygon scanner is expressed by the following formula.

$$R=(60/N) \times (D/25.4) \times V/m$$

Here, the number of the luminous sources is desired to be such that the rotational speed of the polygon scanner becomes less than a speed at which the housing deformation due to heat becomes a predetermined tolerance. In this aspect, it is effective to employ a semiconductor laser array wherein two or more luminous sources are monolithically arranged at intervals of dozens of μm.

For example, Patent Reference 1 proposes a multi-beam luminous source apparatus wherein a sub scanning interval of beam-spot arrays constituted by two or more luminous sources is adjusted by rotationally adjusting a luminous source unit that includes a semiconductor laser array around an optical axis of an image-formation optical system. Further, Patent Reference 2 discloses an image formation apparatus wherein two or more lines are simultaneously formed by carrying out a package scan using a two-dimensional-array unit.

[Patent Reference 1] Japanese Patent No. 3670858
[Patent reference 2] JPA 2003-211728

DESCRIPTION OF THE INVENTION

[Problem(s) to be Solved by the Invention]

Although using the semiconductor laser array is effective, it is indispensable to structure the luminous source unit such that beam spots are uniformly provided on the surface of the scanning object; otherwise, image quality is degraded. That is, properties of the optical beams have to be uniform to obtain a high quality image. Especially, since a coupling lens is arranged in common for two or more luminous sources, the greater is the number of the arrays containing luminous sources, the greater becomes the number of the luminous sources located at positions distant from the optical axis. The coupling lens is for converting a diffused light beam from the luminous sources into parallel optical flux. This is because non-convergence, in other words variation from the parallel optical flux, causes an error at image-formation positions on the surface of the scanned object. For this reason, diameters of the beam spots become different between scanning lines, and image quality is degraded, resulting in such as concentration unevenness and hue difference.

As described above, while it is necessary to constitute the luminous source unit in consideration of providing uniform beam spots on the surface of the scanning object in order to obtain a high quality image, the semiconductor laser array inherently has the following problem. That is, generally, chip mounting precision of the semiconductor laser array is about 10 μm. Accordingly, if the distance between luminous sources arranged at an end is, e.g., 400 μm, the plane of the luminous source array may be inclined a maximum of 1.5° to a plane that perpendicularly intersects the optical axis. In an attempt to solve this problem, light emitting point position precision is conventionally defined with reference to a mounting plane of the semiconductor laser array; however, this attempt poses a problem in that the yield is poor.

SUMMARY OF THE INVENTION

The present invention provides a multi-beam luminous source apparatus, an optical scanning apparatus, and an image formation apparatus that substantially obviate one or more of the problems caused by the limitations and disadvantages of the related art.

Specifically, according to the present invention, beam spot properties are made uniform even if the number of arrays containing the luminous sources is increased for multi-beam image formation, the luminous sources for recording a first line are made to stabilize the image quality for every print, and arrangement precision with reference to the coupling lens is easily attained through adjustment, even if luminous points fluctuate between luminous source units due to the chip mounting error of the semiconductor laser array such that the yield is raised and assembly efficiency is improved.

Features of embodiments of the present invention are set forth in the description that follows, and in part will become apparent from the description and the accompanying drawings, or may be learned by practice of the invention according to the teachings provided in the description. Problem solutions provided by an embodiment of the present invention will be realized and attained by a multi-beam luminous source apparatus, an optical scanning apparatus, and an image formation apparatus particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides a multi-beam luminous source apparatus, an optical scanning apparatus, and an image formation apparatus as follows.

[Means for Solving the Problem]

A preferred embodiment of the present invention provides a multi-beam luminous source apparatus, comprising:

a luminous source unit that includes a plurality of luminous sources monolithically arranged in a direction of main scanning;

a coupling lens for converting optical beams emitted from the luminous source unit into a predetermined convergence state; and a supporting member for supporting the luminous source unit and the coupling lens in one body; wherein the supporting member includes a first member for supporting the coupling lens, the first member being arranged such that a rotational adjustment is possible around an optical axis of the optical beams emitted from the luminous source unit, and a second member for supporting the luminous source unit, the first member being attached to the second member such that an inclination of the first member in a main scanning plane can be adjusted.

As described above, the supporting member for supporting the luminous source unit and the coupling lens is made of two members that are joined in one body. The first member supports the coupling lens, and is joined so that a rotational adjustment may be carried out centering on the optical axis of the optical beams from the luminous source unit, that is, arrangement adjustment of the coupling lens is enabled. Further, the second member is joined so that adjustment of the inclination of the first member in the main scanning plane may be attained. By the arrangement adjustment of the coupling lens and the inclination adjustment of the first member, light emitting point positions of the luminous sources arranged at an end in the direction of main scanning can be aligned in a plane that perpendicularly intersects the optical axis of the coupling lens. In this way, uniform beam spot properties and stabilization of image quality can be attained. Further, the adjustment is simple, contributing to improvement of the yield and improvement of assembly efficiency.

According to another aspect of the invention, the second member supports a circuit board on which are mounted the luminous source unit and at least a part of a driving unit for modulating the luminous sources of the luminous source unit.

According to another aspect of the invention, the second member has a contacting face that is parallel to an array formed by the luminous sources of the luminous source unit, and the second member positions and supports the luminous source unit at the contacting face.

According to another aspect of the invention, the first member has a reference plane that perpendicularly intersects the optical axis of the coupling lens, the first member joining and supporting the second member at the reference plane.

According to another aspect of the invention, the second member is attached to the first member at the reference plane such that arrangement adjustment may be performed.

According to another aspect of the invention, the second member is attached to the first member with the inclination in the main scanning plane being adjustable so that the convergence state of the optical beams of at least luminous sources arranged at an end in the direction of main scanning out of the luminous sources of the luminous source unit is attained.

According to another aspect of the invention, the luminous sources of the luminous source unit are arranged at equal intervals in the direction of main scanning.

According to another aspect of the invention, the luminous sources of the luminous source unit are arranged in two dimensions, and the number of the luminous sources in the direction of main scanning is greater than the number of the luminous sources in the direction of sub scanning.

According to another aspect of the invention, an optical scanning apparatus is provided, which comprises:

the multi-beam luminous source apparatus as described above;

a deflection unit for deflecting and scanning the optical beams from the luminous sources of the luminous source unit in block; and an image-formation optical system for forming an image on a scanned surface (photo conductor) with the optical beams deflected by the deflection unit.

According to another aspect of the invention, the multi-beam luminous source apparatus carries out a rotational adjustment around a center of the optical axis of the optical beams emitted from the luminous source unit so that an interval of beam spots in the direction of sub scanning generated by the luminous sources of the luminous source unit may serve as an integral multiple of one scanning line pitch corresponding to recording density.

According to another aspect of the invention, an image formation apparatus is provided, which comprises:

the optical scanning apparatus as described above;

an image supporting object for forming an electrostatic latent image by the optical beams from the luminous sources of the luminous source unit;

a development unit for developing the electrostatic latent image formed on the image supporting object with toner; and an imprinting unit for imprinting the toner image developed by the development unit onto a recording medium (paper).

[Effect of the Invention]

According to the present invention, the properties of the beam spots are uniform even if the number of arrays of the luminous source increases in multi-beam applications; image quality of every print is stabilized no matter which luminous sources record the first line; even when variation arises in light emitting point positions of the luminous sources due to the chip mounting error of the semiconductor laser array, improvements in the yield and assembly efficiency are attained by correcting the light emitting point positions with reference to the coupling lens by a simple adjustment.

BRIEF DESCRIPTION OF THE DRAWINGS

FIG. 7 gives a perspective diagram, graphs, and a schematic diagram showing the liquid crystal orientation of a liquid crystal deflection unit included in the multi-beam luminous source apparatus according to the embodiment of the present invention;

DESCRIPTION OF THE PREFERRED EMBODIMENTS

In the following, embodiments of the present invention are described with reference to the accompanying drawings.

Embodiment 1

First, a multi-beam luminous source apparatus according to the embodiment of the present invention is described, referring to the accompanying drawings.

Figure 1:
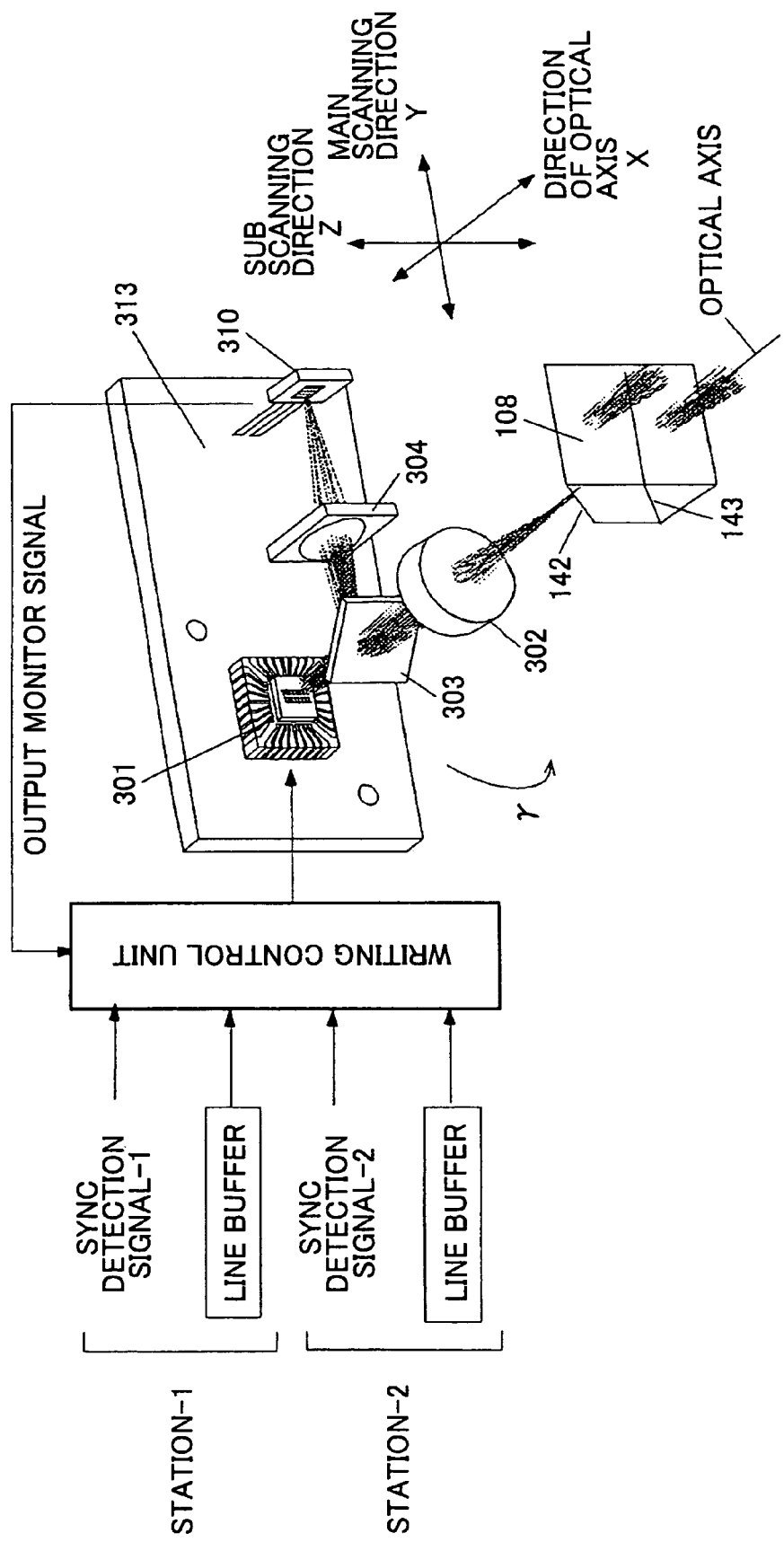
FIG. 1 is a perspective diagram showing the structure of a multi-beam luminous source apparatus according to an embodiment of the present invention.

With reference to FIG. 1, a luminous source unit of the multi-beam luminous source apparatus according to the embodiment includes a Vertical Cavity Surface Emitting Laser 301, a coupling lens 302, a branch mirror 303, a convergent lens 304, an optical detection sensor 310, and a control substrate 313.

The Vertical Cavity Surface Emitting Laser 301, which is a monolithic two-dimensional array, emits two or more optical beams. The optical beams are polarized by the branch mirror 303 into a S polarization component and a P polarization component. Positioning of the S polarization component is adjusted with reference to a direction X that is the optical axis of the coupling lens 302, a direction Y of main scanning, and a direction Z of sub scanning so that the S polarization component is symmetrically aligned to the optical axis. The coupling lens 302 outputs parallel optical flux. The parallel optical flux from the coupling lens 302 is led to an optical flux dividing prism 108 that is constituted by a combination of a parallelogram prism 142 and a triangle prism 143, and the parallel optical flux is divided into two parts, namely, an upper beam and a lower beam in the sub scanning direction.

On the other hand, the P polarization component deflected by the branch mirror 303 goes through a convergent lens 304, and is detected by the optical detection sensor 310 mounted on the control substrate 313 on which the Vertical Cavity Surface Emitting Laser 301 is also mounted. After scanning is started in each face of a polygon mirror and until reaching an image area, the luminous sources are turned on one by one, the optical detection sensor 310 measures the intensity of each beam, and the magnitude of the current is adjusted so that the output of each luminous source agrees with a predetermined value. The adjusted current is maintained until the image area is completely scanned. When a next face of the polygon mirror starts scanning, the current is adjusted again.

The control substrate 313 includes a power control unit for uniformly maintaining the luminescence output of the luminous source, and a driving unit for modulating the luminous source for image information. The control substrate 313 and the coupling lens 302 are arranged in one body, and constitute the luminous source unit.

Figure 17:
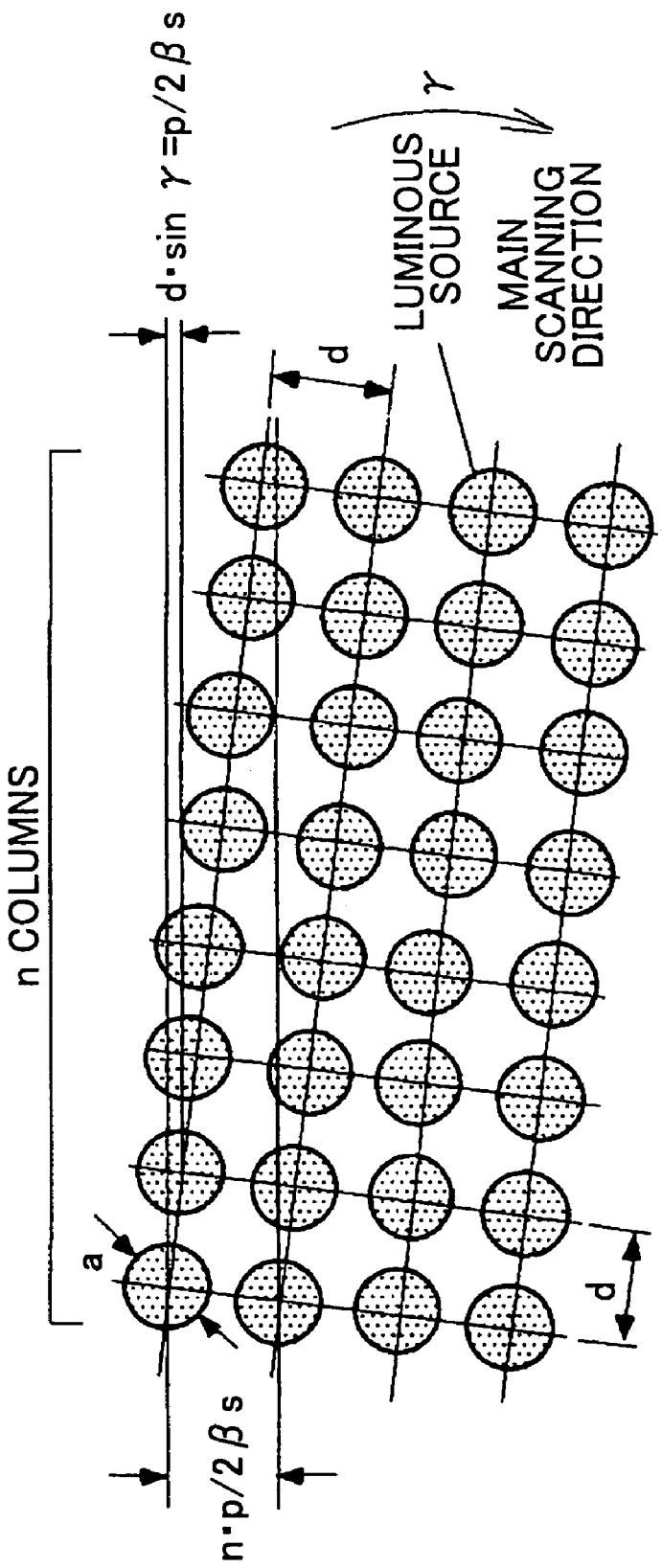
FIG. 17 is a schematic diagram showing the array arrangement of a Vertical Cavity Surface Emitting Laser of the multi-beam luminous source apparatus according to the embodiment of the present invention.

Further, the Vertical Cavity Surface Emitting Laser 301 according to the embodiment includes luminous sources arranged in two dimensions of n columns×m lines; here in this example, 32 luminous sources are arranged in 8 columns×4 lines at equal intervals d in the shape of a matrix as shown in FIG. 17. The matrix is inclined by γ as shown in FIG. 17. The inclination is adjusted such that a pitch p between the beam spots in the direction of sub scanning on a photo conductor drum agrees with the scanning line pitch corresponding to recording density. In this way, 4 lines are simultaneously scanned at every station. The amount of inclination γ is expressed by the following formula, where βs is a sub scanning scale-factor of the entire optical system.

$$\sin\gamma = (\cos\gamma)/n = p/d \times \beta s$$

Naturally, the array direction of the light emitting points may be arranged at a predetermined angle when the Vertical Cavity Surface Emitting Laser is processed. In addition, a liquid crystal deflection unit 117 deflects only a polarization component that agrees with the array direction of the liquid crystal as described below; for this reason, the polarization of the luminous source is arranged in one direction.

Figure 16:
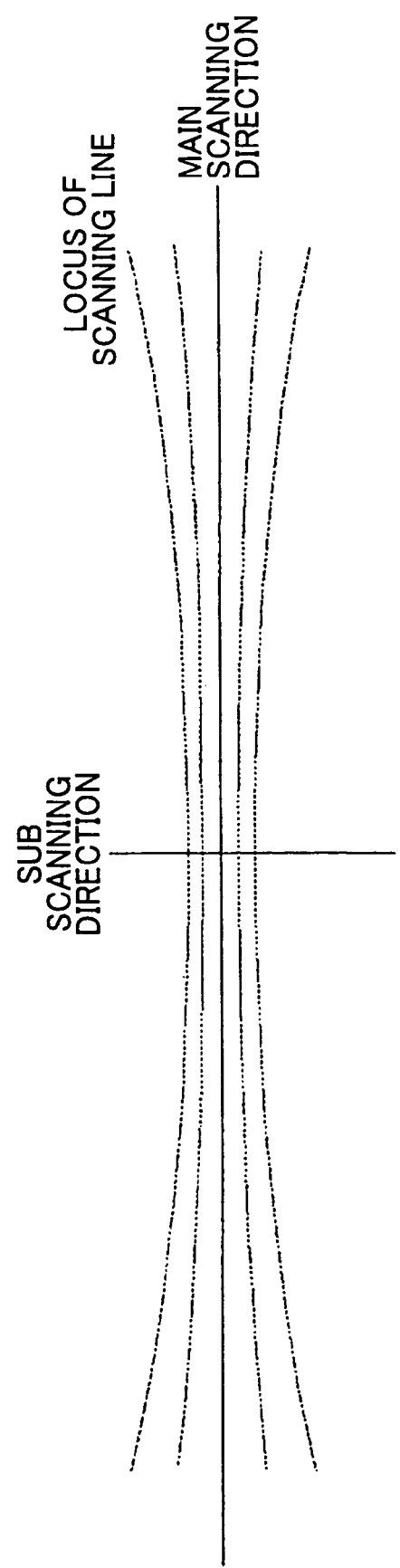
FIG. 16 is a schematic diagram showing a locus of scanning lines on a photo conductor from the luminous sources of the multi-beam luminous source apparatus according to the embodiment of the present invention.

Further, FIG. 16 shows the locus of the scanning lines from the corresponding luminous sources to the surface of the photo conductor. Here, an optical beam from a luminous source that is arranged with an inclination in the direction of sub scanning is curved because the optical beam travels off the optical axis of the image-formation optical system. The curve cannot be rectified by a bend compensation mechanism described below. Accordingly, in order to limit the amount of the curve to be within a predetermined value, the number of lines m of the array in the direction of sub scanning is inevitably limited. According to the embodiment, the number of lines m of the array in the direction of sub scanning is made less than the number of columns n of the array in the direction of main scanning.

As described above, as for the luminous sources of the Vertical Cavity Surface Emitting Laser 301, the number of lines m of the array in the direction of sub scanning is limited in order to limit the amount of the curve to be within the predetermined value. If the number of lines m is desired to be great, the number of columns n of the array in the direction of main scanning has to be increased. In this case, it is important that all the luminous sources be arranged perpendicular to the optical axis of the coupling lens 302. Otherwise, convergence states of the beams output from the coupling lens 302 differ from luminous source to luminous source, resulting in image-formation position shifts on the photo conductor, i.e., non-uniform diameters of the beam spots. This degrades image quality, resulting in such as periodic concentration unevenness and hue change depending on which luminous sources are used for the first line. In order to cope with this problem, according to the embodiment, each luminous source is aligned to the coupling lens 302 by arranging the convergence states of the luminous sources at the ends in the directions of main scanning. Hereafter, the specific structure of the embodiment is described.

Figure 2:
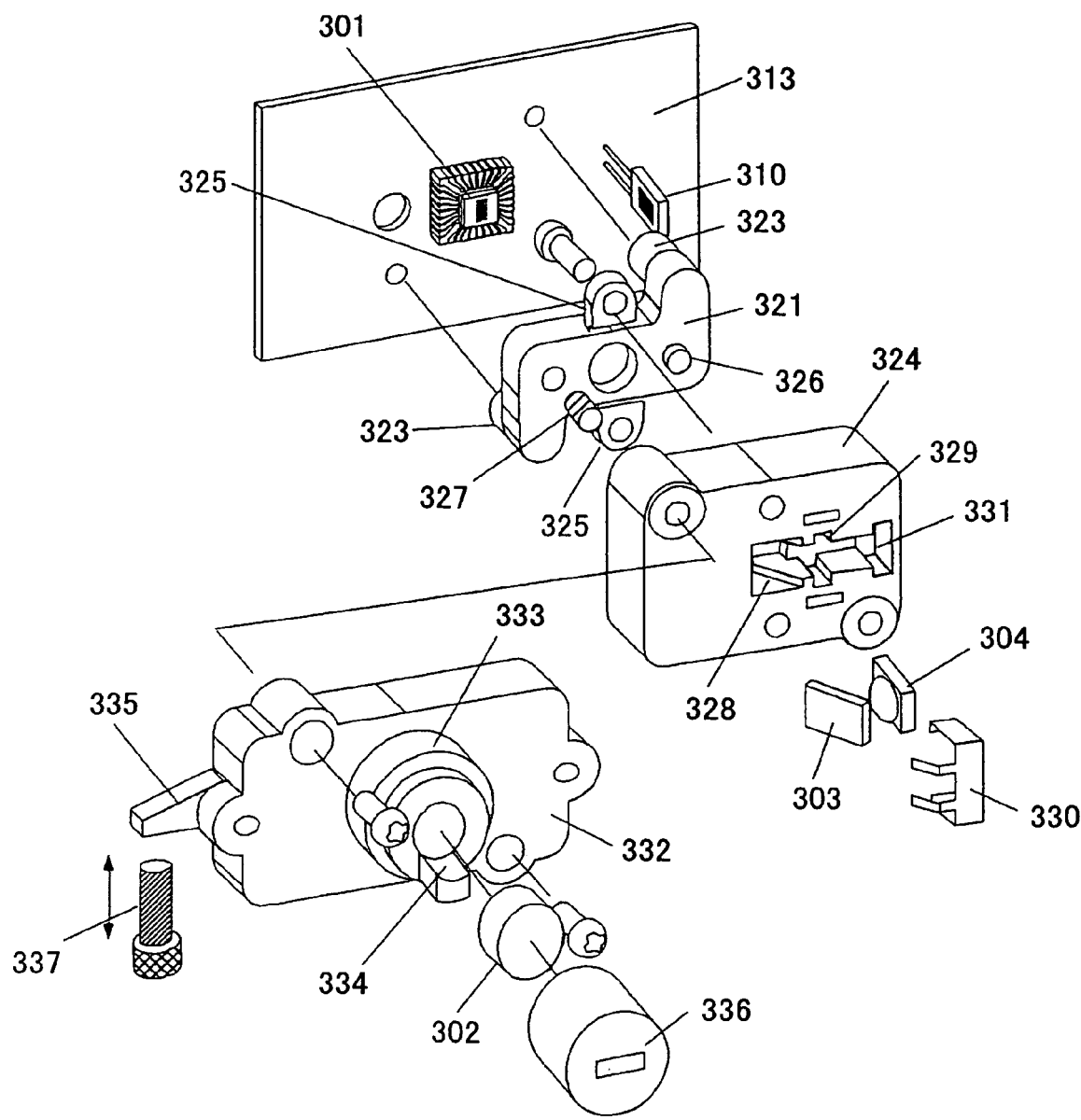
FIG. 2 is a exploded perspective diagram showing the structure of the multi-beam luminous source apparatus according to the embodiment of the present invention.
Figure 3:
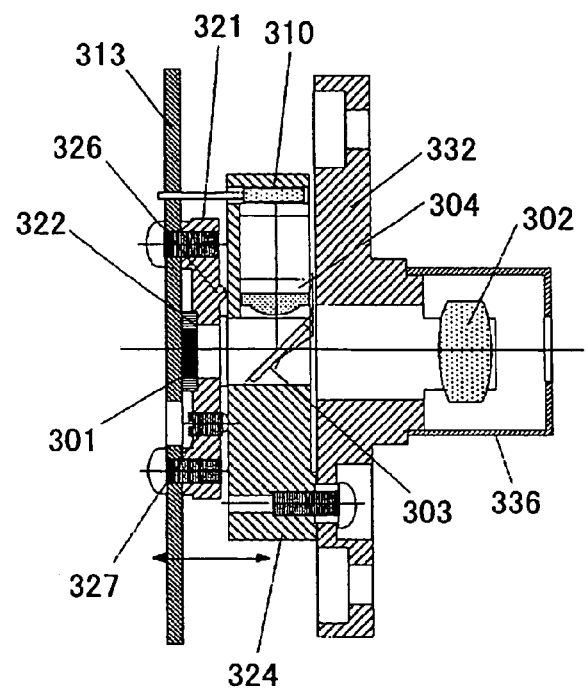
FIG. 3 is a main scanning cross-sectional diagram showing the structure of the multi-beam luminous source apparatus according to the embodiment of the present invention.

FIG. 2 shows the specific structure of the luminous source unit of this embodiment, and FIG. 3 shows a main scanning cross section (plane) (viewed from above) of the luminous source unit. The luminous source unit includes a holding member 332 (the first member) made of resin, and a base member (the second member) made of die cast aluminum. The base member is constituted by a base member A 321 and a base member B 324. The holding member 332 is for supporting the coupling lens 302. The base member A 321 is for supporting the control substrate 313, on which the Vertical Cavity Surface Emitting Laser 301 is mounted. The base member B 324 contains the branch mirror 303, the convergent lens 304, and the optical detection sensor 310. The holding member 332 and the base member 321 are joined with a screw at a reference plane that perpendicularly intersects the optical axis of the coupling lens 302.

The Vertical Cavity Surface Emitting Laser 301 includes a chip forming the luminous sources packaged in a ceramic package to which a lead terminal is arranged, and its surface is parallel to the array plane of the luminous sources. Further, the control substrate 313 and the base member A 321 are joined such that an edge of the ceramic package surface contacts a contact plane 322 formed in the base member A 321. The base member A 321 is fixed to the control substrate 313 with two screws through two supports 323. In this way, the Vertical Cavity Surface Emitting Laser 301 is placed facing in the direction of the optical axis.

The base member B 324 has a joining plane for being joined to the base member A 321; the joining plane is parallel to the reference plane. The base member A 321 has two contacting points arranged one on each side in the direction of main scanning of the attachment section of the Vertical Cavity Surface Emitting Laser 301. One contacting point is a contacting point 326 formed on the base member A 321 in one body, and the other contacting point is the projecting tip of an adjustment screw 327 that is screwed into the base member A 321. The base member B 324 is joined to the base member A 321 with two screws through a flange section 325 that is extended in the directions of sub scanning. The base member B 324 contacts the two contacting points 326 and 327.

Figure 19:
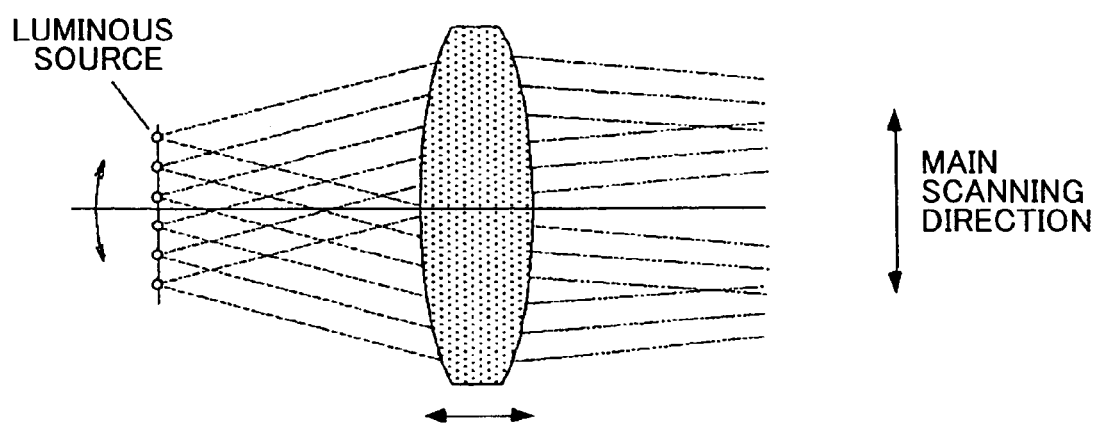
FIG. 19 is a schematic diagram showing a positional relationship between a coupling lens and the luminous source of the multi-beam luminous source apparatus according to the embodiment of the present invention.

The adjustment screw 327 penetrates a hole in the control substrate 313 so that the adjustment screw 327 can be rotated by a screw driver. A slot is formed in a base section of the flange section 325. Accordingly, by rotating the adjustment screw 327, the base section is twisted with the contacting point 326 serving as the supporting point, and the inclination of the base member A 321 with reference to the base member B 324 in the main scanning plane can be adjusted. This inclination adjustment and the coupling lens arrangement adjustment can performed so that the light emitting positions of the luminous sources arranged at the ends of the Vertical Cavity Surface Emitting Laser 301 in the directions of main scanning may be aligned to the coupling lens 302 as shown in FIG. 19. In addition, the branch mirror 303 is vertically arranged in a mirror attachment section 328 formed in the base member B 324 so that it is inclined by 45° in the main scanning plane with reference to the optical axis. An edge of the convergent lens 304 is inserted into a lens insertion section 329, and is supported by a flat spring 330. The optical detection sensor 310 is arranged on the control substrate 313. A sensor part of the optical detection sensor 310 is engaged by a sensor insertion section 331 formed in the base member B 324.

The holding member 332 has a cylinder section 333 that is coaxial to the optical axis of the coupling lens 302, and a supporting section 334 for supporting the circumference of the coupling lens 302. Sections 333 and 334 are made in one body with the holding member 332. The coupling lens 302 is adjusted in the direction X, i.e., along the optical axis so that the optical beams from the luminous sources become parallel optical flux, and is adjusted in the directions Y (main scanning direction) and Z (sub scanning direction) so that the light beams are arranged symmetrically with reference to the optical axis. Further, UV hardening adhesives are supplied into the error between the circumference of the coupling lens 302 and the supporting section 334 so that adhesion fixation is carried out. Further, a rectangular aperture is formed in a cap 336 fixed at the tip of the cylinder section 333 so that the optical flux passing through the rectangular aperture arranged in an area where the fluxes of light from the luminous sources overlap is aligned for each optical beam.

The luminous source unit structured in this way is accommodated in a not illustrated housing that engages the cylinder section 333. An adjustment screw 337 contacts a lever 335 so that a rotational adjustment centered on the optical axis can be carried out.

Figure 5:
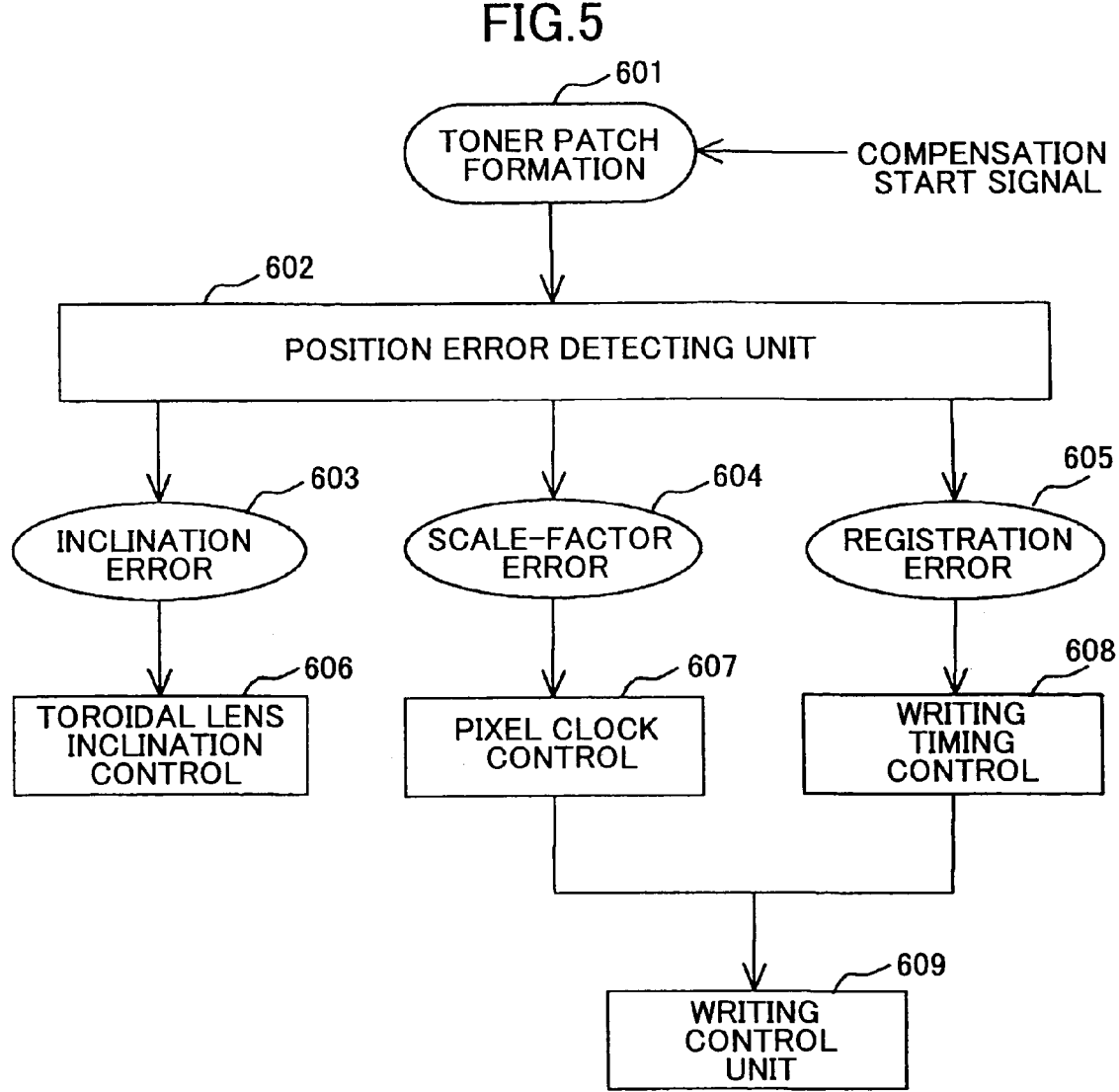
FIG. 5 is a block diagram of beam-spot position error control carried out by the multi-beam luminous source apparatus according to the embodiment of the present invention.

FIG. 5 is a block diagram showing the beam-spot position error control operation carried out on the luminous sources according to the embodiment. After a compensation start signal is provided, toner patch formation 601 is carried out. Then, a position error detecting unit 602 detects an inclination error 603, a scale-factor error 604, and a registration (toner) error 605. If the inclination error 603 is detected, toroidal-lens inclination control 606 is performed. If the scale-factor error 604 is detected, pixel clock control 607 is performed. If the registration error 605 is detected, writing timing control 608 is performed. The pixel clock control 607 and the writing timing control 608 are controlled by a writing control unit 609. Beam-spot position error control between each station is carried out at a predetermined timing such as when power is turned on, when recovering from a standby state, and when a predetermined number of sheets have been processed.

Conditions of superposed color images are detected by reading a detection pattern of a toner image formed on an imprint belt. Registration and a scale factor in the direction of main scanning, and registration and inclination in the direction of sub scanning are detected by a relative error with reference to a specific station. Specifically, the registration in the direction of main scanning is compensated for by varying the timing of generating a synchronous detection signal; and the scale factor is compensated for by varying a pixel clock with which each light emitting point of the luminous source unit is modulated. Further, as for the registration in the direction of sub scanning, first, the writing start timing that gives the smallest registration error is established for every other polygon mirror face, i.e., the number of beams simultaneously scanned is n, i.e., per 32-point array in this embodiment. Then, for any excess, another luminous source for forming the first line is selected from two or more luminous sources. In this way, the beginning position of the first line for every line pitch is aligned. The inclination is compensated for by inclining a toroidal lens, as described below, through operating a stepping motor.

Figure 12:
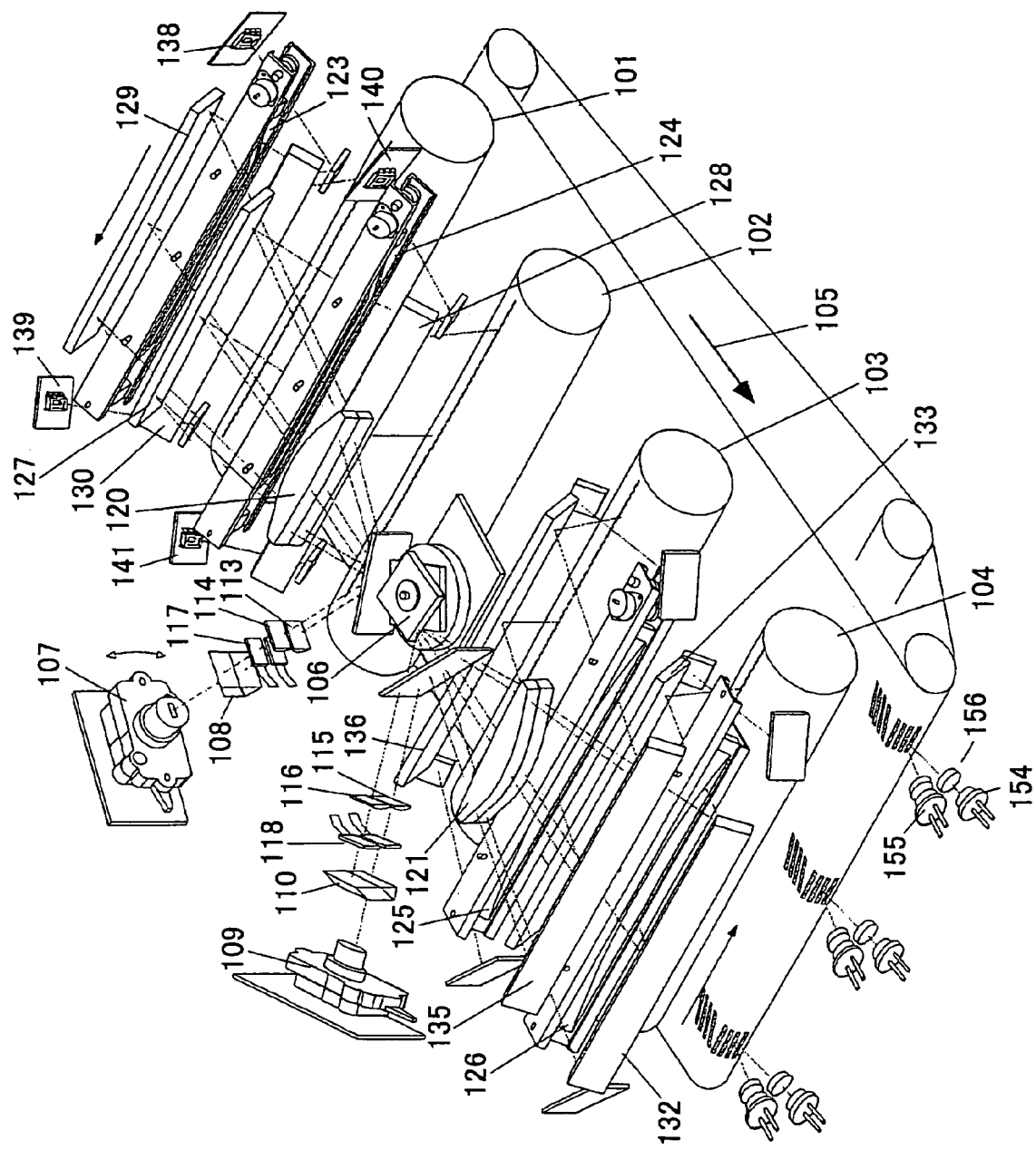
FIG. 12 is a perspective diagram showing the structure of an optical scanning apparatus according to the embodiment of the present invention.

A toner image pattern detecting unit for detecting the pattern of the toner image includes a light emitting diode LED unit 154 for lighting (described later), a photo sensor 155 for receiving a reflected light, and a pair of condenser lenses 156 corresponding to these (154 and 155) (ref. FIG. 12). Then, a line pattern inclined about 45° to the main scanning line is formed, and a time difference is detected while the imprint belt is moving. According to the present embodiment, three toner image pattern detecting units are arranged, one each at both ends and the central part. The inclination is obtained based on the difference between the ends, and the scale factors are obtained for ranges between the center point and each of the ends. In this way, compensations are carried out with reference to a reference station.

Figure 6:
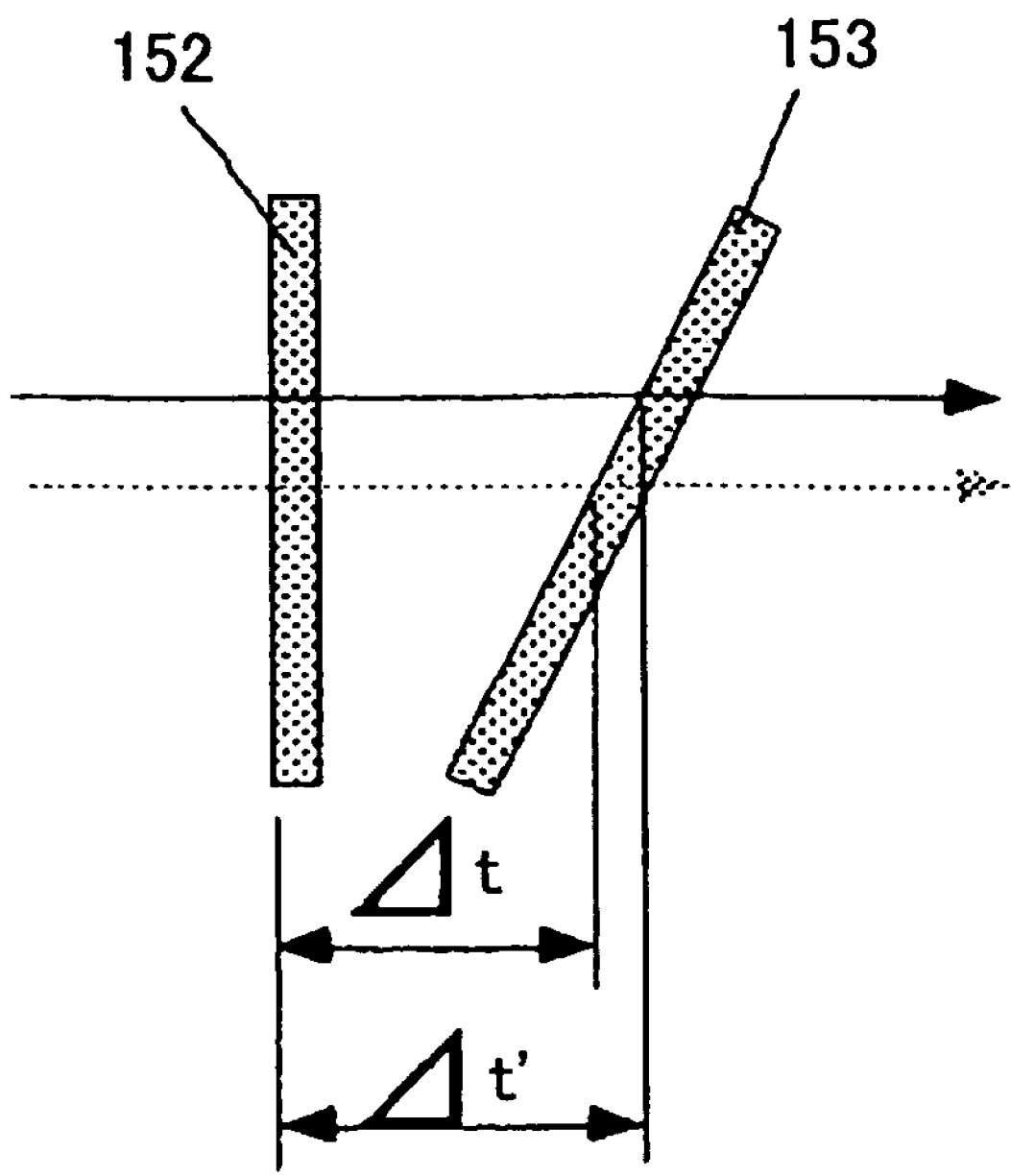
FIG. 6 is a plan view of a photo diode and an optical detection sensor that are included in the multi-beam luminous source apparatus according to the embodiment of the present invention.

However, if the compensation is too often carried out, printing operations are interrupted and printing productivity is degraded, and toner consumption becomes excessive. Accordingly, it is necessary to decrease the frequency of the compensation operations. That is, it is desirable that the beam-spot positions be stably maintained for a long time. Then, the optical detection sensor according to the embodiment includes a photo diode 152 arranged perpendicular to the direction of main scanning, and a photo diode 153 that is arranged not in parallel with the photo diode 152 as shown in FIG. 6. Here, a time t0 is defined as a time when an optical beam reaches the optical detection sensor on the scanning start side of the photo diode 152; a time t1 is defined as a time when the optical beam reaches the optical detection sensor on the scanning start side of the photo diode 153; then, $\Delta t$ is defined as the difference between t1 and t0; and a change of the difference $\Delta t$ in time, i.e., $\Delta t - \Delta t'$, is always monitored. Based on the change of the difference $\Delta t$, a reference point of the pixel clock, which has been set up through the compensation described above, is updated, and thereby the change of the main scanning scale factor is compensated for. Further, based on $\Delta t$, an error $\Delta y$ of the sub scanning position of the optical beam is detected and compensated for.

Here, the error $\Delta y$ of the sub scanning position is expressed by $$\Delta y = (V/\tan \gamma) \times (\Delta t - \Delta t') = k \times P + \Delta P$$

where $\gamma$ is a tilt angle of the photo diode 153, and V is the scanning speed of the optical beam.

A component beyond a one-line pitch P is compensated for by selecting a luminous source for recording the first line, and an excessive component $\Delta P$ below the one-line pitch is offset-compensated for by using a liquid crystal deflection unit described below. In this way, the scanning position is maintained so that the sub scanning registration of each color image may not shift.

FIG. 7 shows the outline of a liquid crystal deflection unit for changing the optical axis. The liquid crystal deflection unit includes liquid crystal between transparent glass boards, and electrodes are formed at the upper and lower ends of a surface of one of the glass boards. When a potential difference is applied between the electrodes, as shown in FIG. 7, potential gradient is generated, orientation of the liquid crystal changes, a refractive-index gradient is generated, and the injection axis of a beam can be slightly deflected as with a prism. As the liquid crystal, nematic liquid crystal, and the like, that has dielectric anisotropy is used. Therefore, if the electrodes are arranged in the direction of sub scanning, the scanning position on the photo conductor can be changed by changing the applied voltage.

Figure 8:
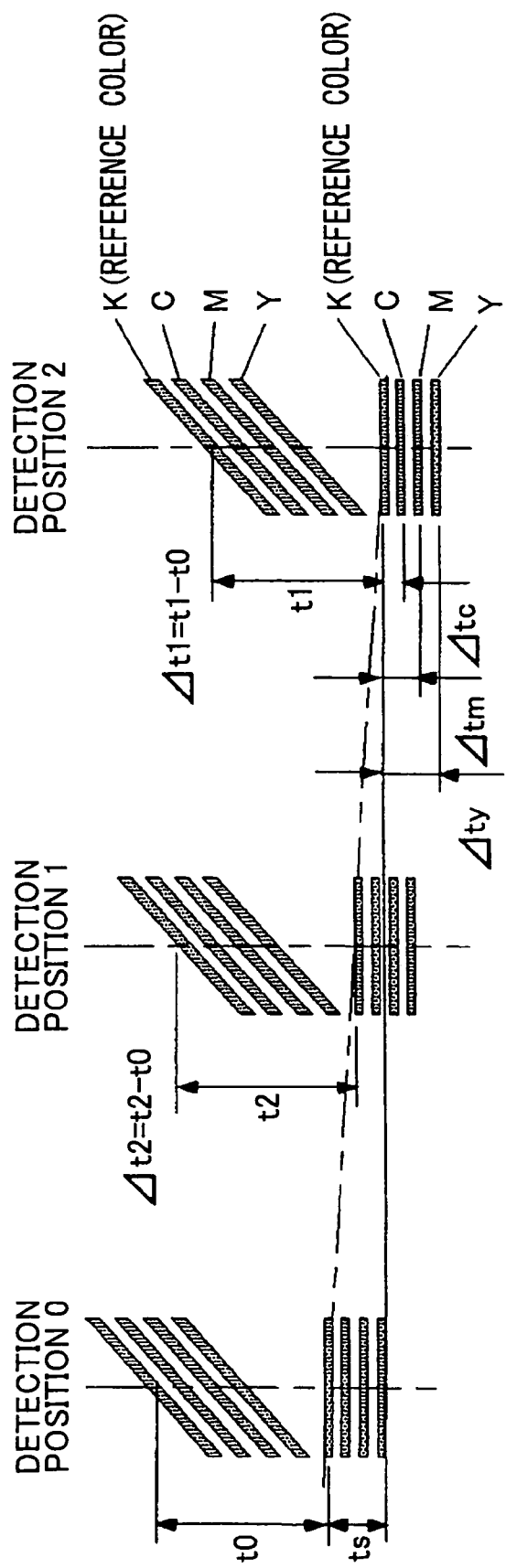
FIG. 8 is a schematic diagram showing a detection pattern used by the multi-beam luminous source apparatus according to the embodiment of the present invention.

FIG. 8 shows an example of the detection pattern that consists of a group of lines in the direction of main scanning, and another group of lines at an angle of 45° to the direction of main scanning. The vertical direction of the drawing is the moving direction of the imprint belt. At each of detection positions 0, 1, and 2, the position error in the direction of sub scanning of each color is obtained based on a difference of detection-time differences $\Delta ty$, $\Delta tm$, and $\Delta tc$ of the group of lines in the direction of main scanning. The position error in the direction of main scanning of each color is obtained based on a difference of t1, t2, from a theoretical value t0.

Figure 9:
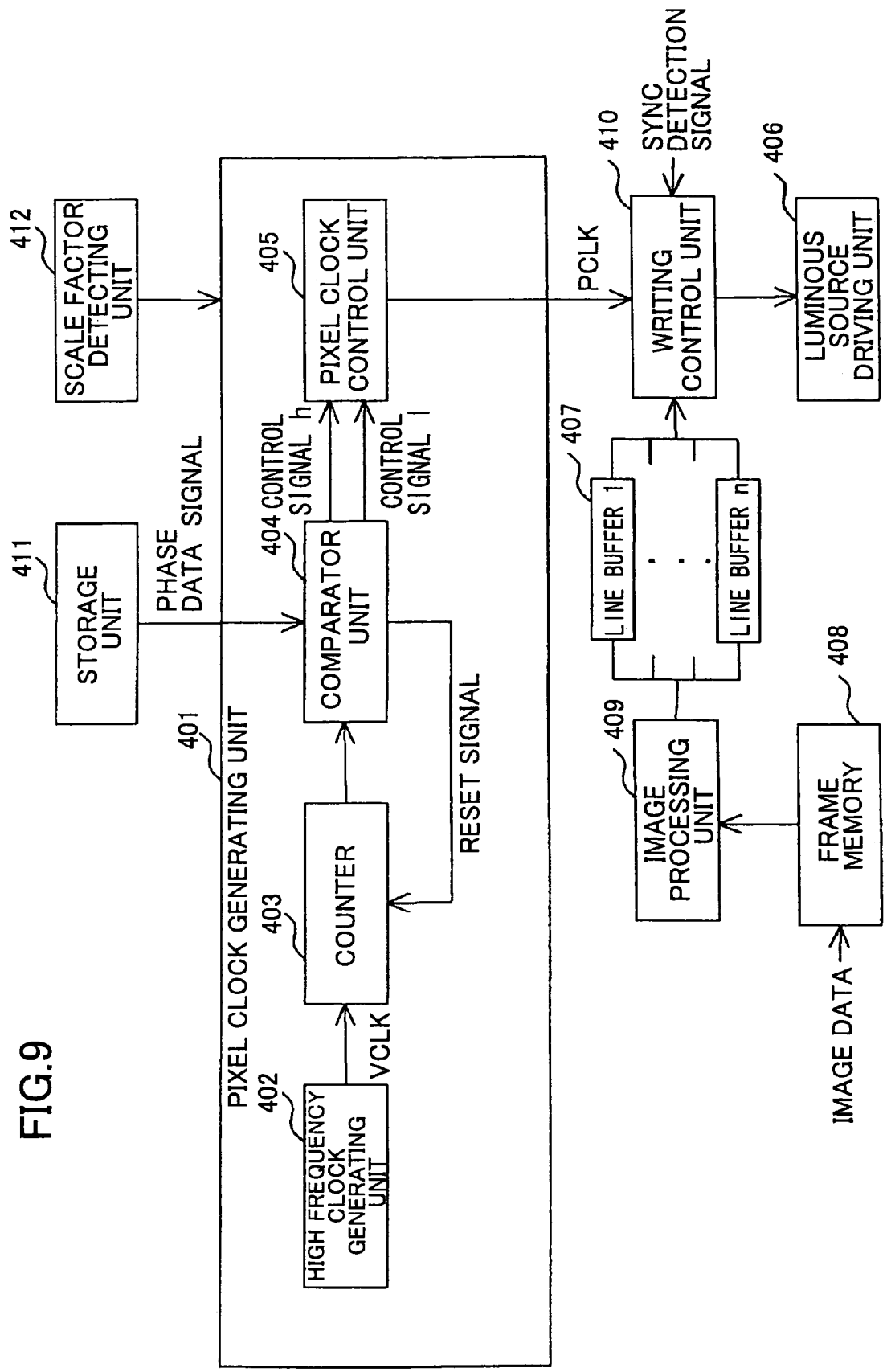
FIG. 9 is a block diagram of a writing control unit of the multi-beam luminous source apparatus according to the embodiment of the present invention.

Next, operations of a writing control unit according to the present embodiment are described with reference to FIG. 9. Image data that are raster-expanded for every color are temporarily stored color by color in a frame memory 408, and are sequentially read by an image-processing unit 409. Then, pixel data of each line are formed according to a matrix pattern corresponding to halftone referring to relationships to a preceding pixel and to a subsequent pixel, and the pixel data are transmitted to line buffers 407 corresponding to each of the light emitting points. The number of the line buffers 407 of the writing control unit is the same as the number of the light emitting points of the semiconductor laser array. A writing control unit 410 reads the contents of the line buffers 407 with a synchronous detection signal serving as a trigger; then, a luminous source driving unit 406 independently modulates each light emitting point according to the contents of the line buffers 407. Accordingly, the light emitting points that are to record the first line can be switched by sequentially choosing the corresponding line buffers 407 that transfer the pixel data.

Next, a pixel clock generating unit 401 for modulating each light emitting point is described. A counter 403 counts a high-frequency-clock VCLK signal generated by a high-frequency-clock generating unit 402. A comparator unit 404 receives a phase data signal H from a storage unit 411, and compares the counted value of the counter 403 with a predetermined value L serving as transition timing of the pixel clock set up beforehand based on a duty ratio, and the phase data H provided by the storage unit 411 specifying the amount of phase shift. If the counted value is in agreement with the predetermined value L, a control signal 1 directing a pixel clock PCLK to fall is output to a pixel clock control unit 405. If the counted value is in agreement with the phase data H, a control signal h directing the pixel clock PCLK to rise is output to the pixel clock control unit 405. Here, the counter 403 is reset simultaneously with the control signal h by the comparator unit 404 so that counting can start from 0 again, and a continuous pulse train is formed.

As described above, the phase data H are provided for each clock, and the pixel clock PCLK is generated wherein a pulse cycle varies from clock to clock. According to the embodiment, the pixel clock PCLK is ⅛ of the high-frequency-clock VCLK, i.e., the phase is variable with a resolution of ⅛ clock.

Figure 10:
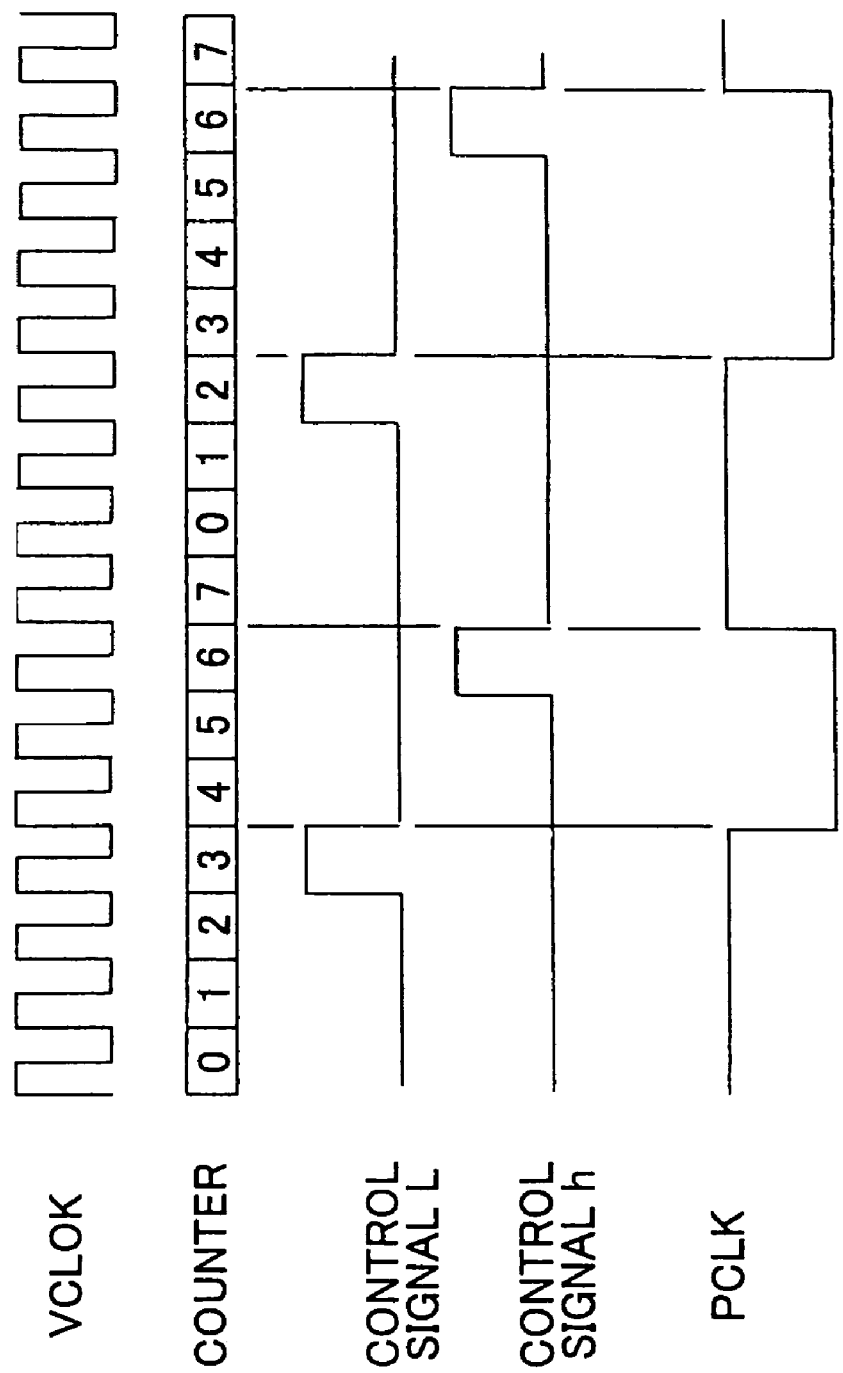
FIG. 10 is a pulse chart showing timings of a clock and a control signal.

FIG. 10 shows an example wherein the phase of a pixel is delayed by ⅛ clock. If the duty rate is 50%, the predetermined value L=3 is given, four counts are carried out by the counter 403, and the pixel clock PCLK is brought down. When the phase is delayed by ⅛ clock, phase data H=6 are given, and the pixel clock PCLK is raised at seven counts. At this time, the counter is reset; for this reason, the pixel clock PCLK is brought down again at four counts. That is, the adjoining pulse cycle is contracted by ⅛ clock. The pixel clock PCLK generated in this way is provided to a luminous source driving unit 406 so that the semiconductor laser is driven with modulated data, on which the pixel data read from the line buffers 407 corresponding to the pixel clock PCLK are superimposed.

By arranging pixels that are phase-shifted at a predetermined interval as described above, pixel density in the direction of main scanning can be adjusted such that a main scanning registration error may become zero at each boundary of divided sections, and a partial fluctuation of the scale factor can be rectified. That is, the global scale factor fluctuation is compensated for by uniformly expanding and contracting the pixel interval by shifting the pixel clock PCLK, and the partial scale factor fluctuation is compensated for by changing the pixel interval every predetermined number of pixels.

Figure 11:
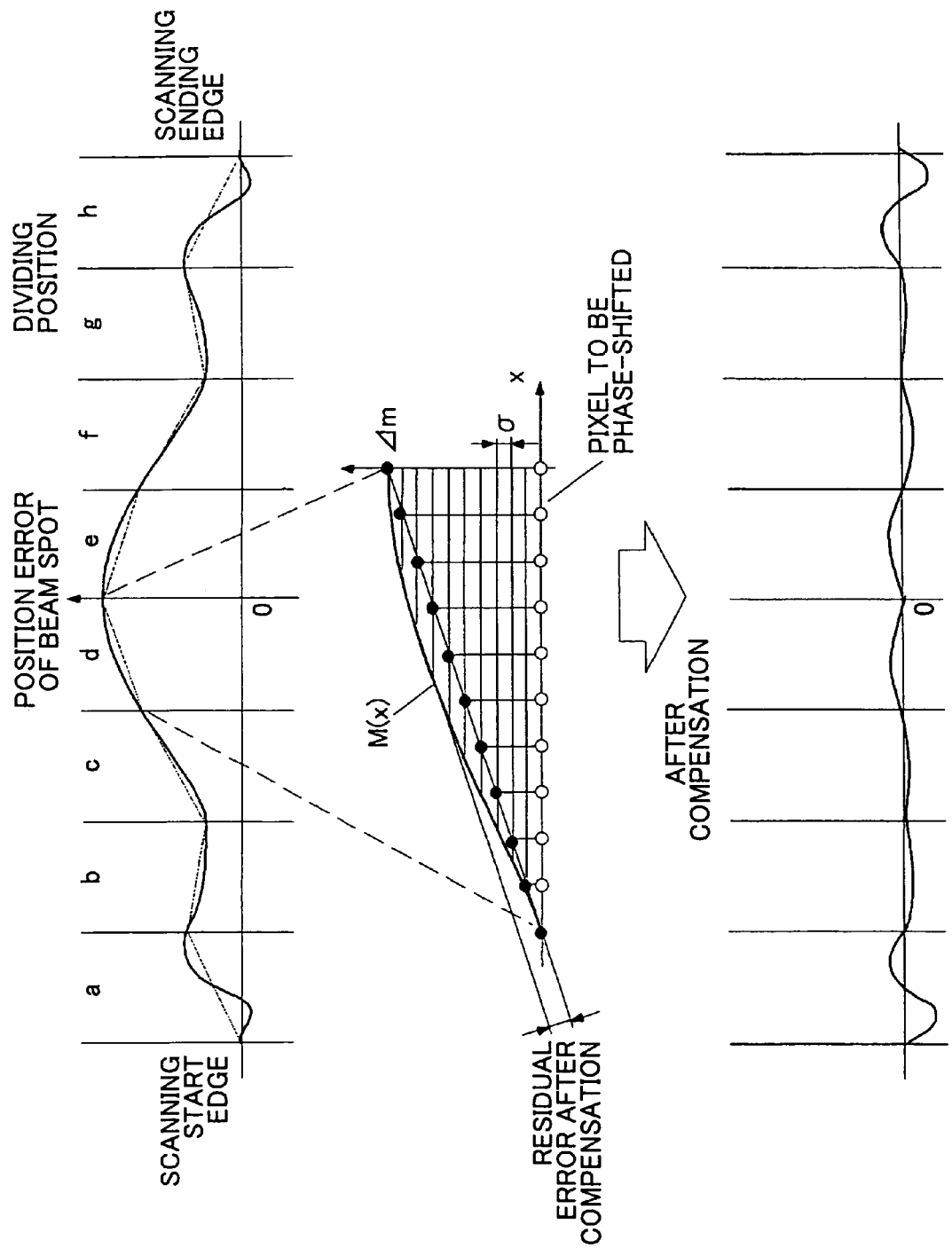
FIG. 11 gives graphs for explaining a beam-spot position error.

According to the embodiment, as shown in FIG. 11, the main scanning area is divided into two or more sections, the interval and shift amount of a pixel that is to be phase-shifted for each section are set up as follows, and are provided as the phase data. For example, where change of the scale factor x of the main scanning position is expressed by L(x), change of a beam-spot position error M(x) is expressed by an integral value of L(x).

$$M(x) = \int L(x)dx$$

Considering that the compensation is carried out so that the beam-spot position error may become 0 at the starting and ending edges of each divided section, an interval D of pixels that are to be phase-shifted is approximated as follows, where $\Delta m$ represents an error of a divided section width accompanying the scale-factor change of a target divided section, $\sigma$ is a constant representing resolution of the phase shift, and N represents the number of pixels in the divided section.

$$D \approx N/(\Delta m/\sigma) \ldots, \text{ where D is an integer.}$$

That is, the phase shift is to be carried out every D pixels in an amount of $\sigma$. According to the present embodiment, $\sigma$ is equal to ⅛ pixel. Accordingly, the number of the divided sections is determined such that a residual beam-spot position error generated in a midrange of each divided section becomes within a tolerable amount. According to the present embodiment, the number of the divided sections is 8. Naturally, the divided section width may be changed for a biased division (unequal division).

Embodiment 2

Next, a multi-beam luminous source apparatus according to another embodiment (Embodiment 2) of the present invention is described.

Figure 4:
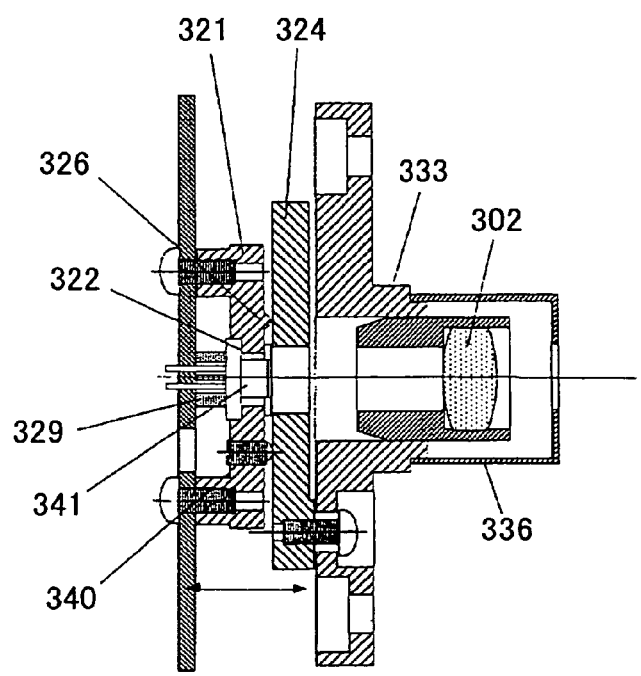
FIG. 4 is a main scanning cross-sectional diagram showing the-structure of the multi-beam luminous source apparatus according to the embodiment of the present invention.

FIG. 4 shows a main scanning cross section of the luminous source unit of Embodiment 2 (seen from above). Embodiment 2 differs from Embodiment 1 shown by FIG. 3 in that the semiconductor laser array is contained in a CAN package. Here, descriptions follow for the case where an edge luminescence type semiconductor laser array having a one-dimensional array is used, and adjustment is possible only in a direction X, i.e., the optical axis of the coupling lens 302. Since the semiconductor laser array 340 is capable of detecting its output using back light, the photo detection sensor is mounted in the CAN package. Other basic structures of the luminous source unit are the same as those of Embodiment 1.

The semiconductor laser array 340 is mounted on the control substrate 313 with a guide member 341 serving as a seat, the guide member 341 penetrating a lead. The surface of a guard part of a heat sink of the CAN package contacts the contacting plane 322 formed in the base member A 321. The semiconductor laser array 340 is fixed to the control substrate by screwing into the two supports 323 supporting the semiconductor laser array 340 in the direction of the optical axis as in Embodiment 1. The base member A 321 is supported by the base member B 324, and is fixed to the holding member 332 with a screw. According to Embodiment 2, the base member is adjusted in the direction Y of main scanning and the direction Z of sub scanning on the reference plane, and fixed.

The coupling lens 302 is accommodated in a cell, fits into a fitting hole coaxially formed with the cylinder section 333, is adjusted in the direction X of the optical axis, and is fixed by adhesive. In either of Embodiments 1 and 2, about the arrangement of the semiconductor-laser array and the coupling lens, the luminous source unit may have a structure other than described above, so long as the structure allows adjustments and support in the direction X of the optical axis, the direction Y of main scanning, the direction Z of sub scanning, and the rotation direction $\alpha$ around the direction Z of sub scanning; and allows adjustments and support of the whole luminous source unit in the rotation direction $\gamma$ around the direction X of the optical axis.

Embodiment 3

Next, an optical scanning apparatus according to Embodiment 3 of the present invention is described with reference to FIG. 12.

The optical scanning apparatus of Embodiment 3 is for scanning four stations, and includes an optical scanning unit that is structured in one body such that optical beams corresponding to the four stations are emitted from two luminous source units, the optical beams are deflected and scanned in countering directions, and four photo conductor drums are scanned by the optical beams by a single polygon mirror 106. The photo conductor drums include a photo conductor drum (yellow) 101, a photo conductor drum (magenta) 102, a photo conductor drum (cyan) 103, and a photo conductor drum (black) 104, which are arranged at equal intervals in a moving direction 105 of an imprint object, and a color image is formed by imprinting and superposing toner images in different colors one by one.

The optical scanning apparatus for scanning the photo conductor drums is structured in one body as shown by FIG. 12, and the optical beams are scanned by the polygon mirror 106 that is structured in two stages, namely an upper mirror and a lower mirror. Luminous source units 107 and 109 are each arranged corresponding to two stations that are scanned in the same direction. Optical flux dividing prisms 108 and 110 divide the optical beams into two parts, namely, an upper part and a lower part, corresponding to the upper mirror and the lower mirror, respectively, of the polygon mirror 106. Images corresponding to each image formation station are formed on corresponding photo conductor drums by turns. Toroidal lenses, fθ lenses, and the luminous source units 107 and 109 that constitute an image-formation optical system are symmetrically arranged with reference to a symmetry plane parallel to a photo conductor drum axis including the rotational axis of the polygon mirror 106. The optical beams from the luminous source units are deflected by the polygon mirror 106 in countering directions, and are led to the corresponding photo conductor drums. Accordingly, the main scanning directions of the stations are opposite for the photo conductor drums that counter; latent images are written such that a scanning start edge of one side and a scanning ending edge of another side may be in agreement by making the widths of the recording areas the same; in other words, by making the scale factors in the direction of main scanning the same.

First, only the part of the optical scanning apparatus associated with the luminous source unit 107 is discussed below. The optical flux dividing prism 108 has a half-mirror face triangle prism 143, and a mirror face parallelogram prism 142 that is parallel to the half-mirror face triangle prism 143 (refer to FIG. 1). Further, half of the light intensity of the beams from the luminous source unit 107 are reflected by the half-mirror, and the remaining half penetrate so that the beams are divided into two, namely, an upper beam 202 and a lower beam 201, respectively, shown in FIG. 13. The upper and lower beams 202 and 201 are aligned and output at a predetermined interval in the direction of sub scanning. According to the embodiment, the interval is 6 mm, which is commonly applied to the vertical interval between the upper mirror and the lower mirror of the polygon mirror and the vertical interval between upper and lower parts of the fθ lens.

Liquid crystal deflection units 117 are respectively arranged for the upper and lower beams output by the optical flux dividing prism 108. When a voltage is applied to the liquid crystal deflection units 117, a potential distribution is produced in the direction of sub scanning, the orientation of liquid crystal changes, a refractive-index distribution is produced, and the direction of the beam can be changed. Accordingly, the scanning position on the photo conductor drum is changed according to the applied voltage.

Cylinder lenses 113 and 114, each being made of two stages, are provided corresponding to the branched optical beams. One of the cylinder lenses 113 and 114 is capable of rotationally moving centered on the optical axis such that focal lines may become parallel. The optical beams are input to the upper and lower mirrors, which are 6 mm apart in the direction of sub scanning, of the polygon mirror 106. The cylinder lenses 113 and 114 have a positive curvature at least in the direction of sub scanning such that the beams are first focused on the deflecting faces of the polygon mirror 106. The toroidal lens described below and the cylinder lenses 113 and 114 constitute a cross-scan error compensation system that makes the deflecting point and the photo conductor surface have a conjugational relationship in the direction of sub scanning.

Each of the upper mirror and the lower mirror of the polygon mirror 106 has four deflecting faces for deflecting and scanning the beams from the light emitting points. The upper mirror and the lower mirror of the polygon mirror 106 are shifted from each other by 45°. The optical beams are scanned by the upper mirror and the lower mirror by turns.

The image-formation optical system includes a fθ lens 120 and the toroidal lenses 123 and 124, all made of plastic. The fθ lens 120 has two layers laminated in one body.

The surface of the fθ lens 120 has a non-circular shape designed such that the beam might move on the photo conductor at uniform velocity in the direction of main scanning with rotation of the polygon mirror 106.

Incidence of each scanning beam that passes through the toroidal lenses 123 and 124 is provided to corresponding optical detection sensors 138 and 140 arranged on the scanning start side, and optical detection sensors 139 and 141 arranged on the scanning ending side. A synchronous detection signal for taking a writing start timing is generated for every luminous source based on a signal detected by the optical detection sensors 138 and 140. A time difference between detection by the optical detection sensors, e.g., 139 arranged on the scanning ending side and detection by the optical detection sensors, e.g., 138 arranged on the scanning start side is measured. The time difference is compared with a predetermined reference value. Based on the comparison, the pixel clock for modulating each luminous source is adjusted so that the error of the scale factor in the direction of main scanning is compensated for as described below.

Figure 13:
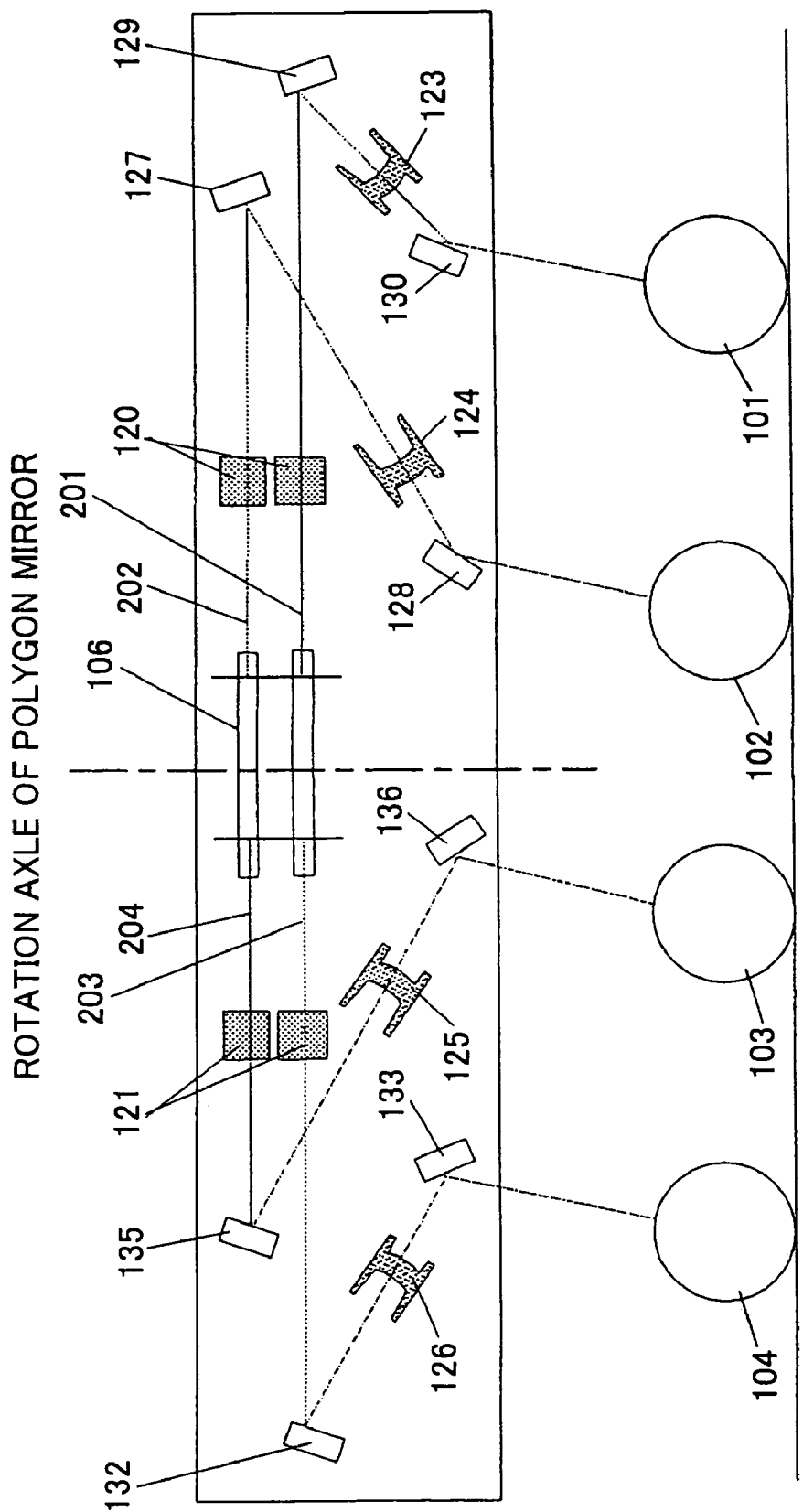
FIG. 13 is a sub scanning cross-sectional diagram showing an optical path of the optical scanning apparatus according to the embodiment of the present invention.

FIG. 13 shows an optical path in the sub scanning cross section (plane). The Vertical Cavity Surface Emitting Laser 301 shown in FIG. 1 are arranged symmetrically about the optical axis of the coupling lens 302 shown in FIG. 1 so that parallel optical flux is obtained. Optical beams of the parallel optical flux are output from the luminous source unit 107 shown in FIG. 12, and first converge near the backside of the coupling lens 302. The optical beams in the direction of main scanning are directed to the fθ lens 120, extending a light interval. The optical beams in the direction of sub scanning converge again near the deflecting face of the polygon mirror 106 through cylinder lenses 113 and 114 shown in FIG. 12, and are made incident on the fθ lens 120. Further, as described above, the optical beams of the luminous source unit 107 are divided into two beams, namely the upper beam and lower beam in the direction of sub scanning by the optical flux dividing prism 108 shown in FIG. 12, and they are led to the photo conductor drums corresponding to the stations.

The optical beam 201 from the lower part of the optical flux dividing prism 108 passes through the cylinder lens 113, is deflected and scanned by the lower mirror of the polygon mirror 106, passes through the lower part of the fθ lens 120, is reflected by a reflecting mirror 129 so as to be incident on the toroidal lens 123, is reflected by a reflecting mirror 130, and forms a latent image in the shape of a spot on the photo conductor drum 101 serving as the first image formation station. In this way, a latent image corresponding to image information of yellow color is formed at the first image formation station.

Further, the beam 202 output from the upper part of the optical flux dividing prism 108 passes through the cylinder lens 114, is deflected and scanned by the upper mirror of the polygon mirror 106, passes through the upper part of the fθ lens 120, is reflected by a reflecting mirror 127, passes through the toroidal lens 124, is reflected by a reflecting mirror 128, and forms a latent image in the shape of a spot on the photo conductor drum 102 serving as the second image formation station. In this way, a latent image corresponding to image information in magenta color is formed at the second image formation station.

Similarly, at the countering station, optical beams from a luminous source unit 109 are divided into an upper beam and a lower beam by the optical flux dividing prism 110, and the divided optical beams are led to the photo conductor drum corresponding to each station. A beam 203 is output from the lower part of the optical flux dividing prism 110, passes through a cylinder lens 115, is deflected and scanned by the lower mirror of the polygon mirror 106, passes through the lower part of a fθ lens 121, is reflected by a reflecting mirror 132, is incident on a toroidal lens 126, is reflected by a reflecting mirror 133, and is provided to the photo conductor drum 104 serving as the fourth image formation station. In this way, image-formation is carried out in the shape of a spot, and a latent image corresponding to image information in black color is formed at the fourth image formation station. Further, a beam 204 is output from the upper part of the optical flux dividing prism 110, passes through the cylinder lens 116, is deflected and scanned by the upper mirror of the polygon mirror 106, passes through the upper part of the fθ lens 121, is reflected by a reflecting mirror 135, is incident on a toroidal lens 125, is reflected by a reflecting mirror 136, and is provided to the photo conductor drum 103 serving as the third image formation station. In this way, image-formation is carried out in the shape of a spot, and a latent image corresponding to image information in cyan color is formed at the third image formation station.

Figure 14:
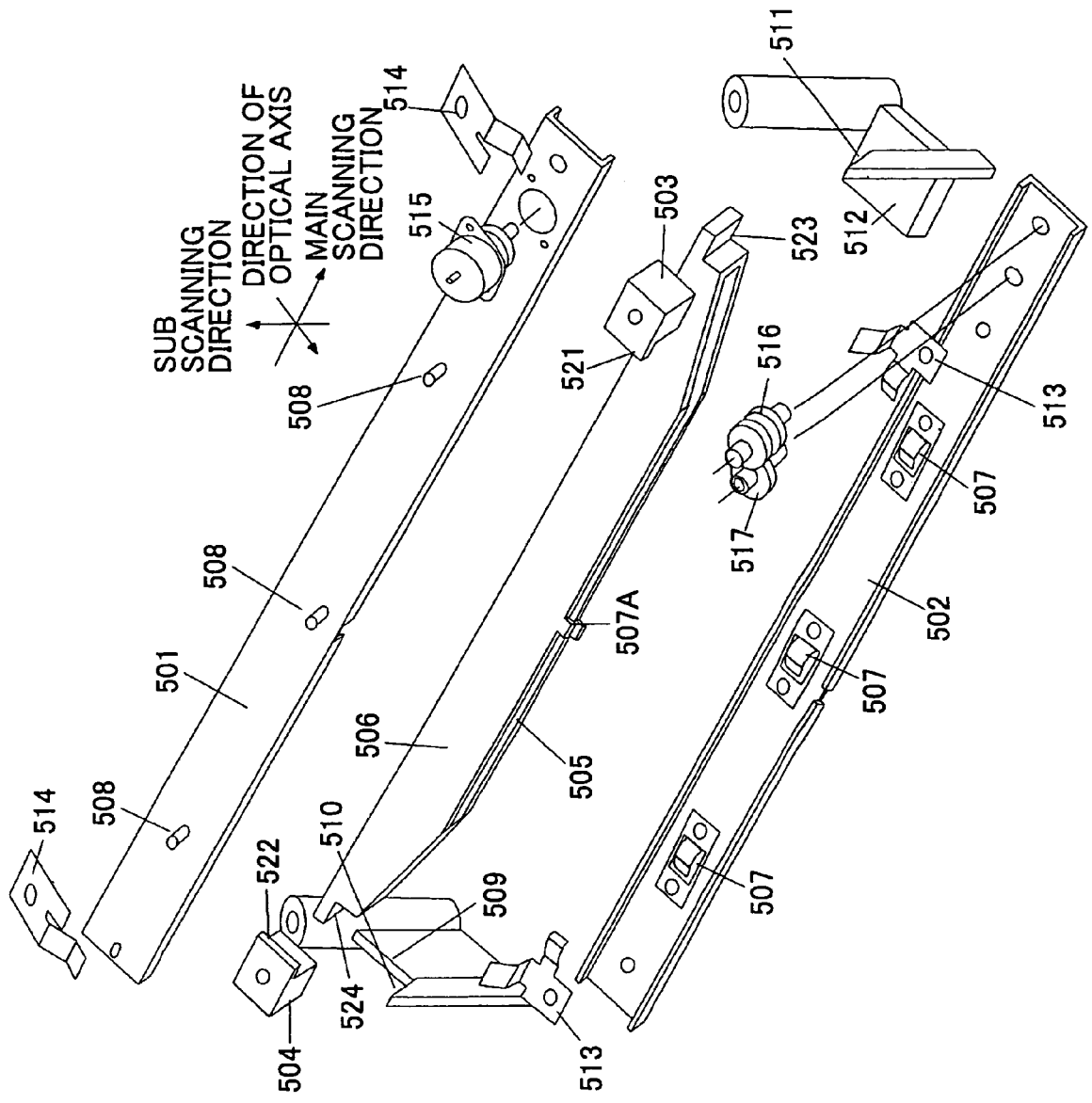
FIG. 14 is a exploded perspective diagram showing the structure of a toroidal lens of the optical scanning apparatus according to the embodiment of the present invention.

FIG. 14 shows the structure of a supporting member of a toroidal lens 505. The toroidal lens 505 has a rib section 506 that is formed in one body with the toroidal lens 505. The rib section 506 supports the toroidal lens 505. Further, a projection 507A for positioning is formed in the central part. Further, a supporting sheet metal 501 and a pressing sheet metal 502 are provided where longitudinal edges are bent in L shapes. Spacers 503 and 504 are arranged at corresponding ends. The toroidal lens 505 is arranged and held in a frame formed by the supporting sheet metal 501, the pressing sheet metal 502, and the spacers 503 and 504}.

The projection 507A is engaged by a notch formed at the central part of the L-shaped portion of the supporting sheet metal 501 so that the toroidal lens 505 is held. Further, positioning in the direction of sub scanning of the rib section 506 is fixed with the ends of its upper surface contacting corresponding installation faces 521 and 522 of the spacers 503 and 504. The installation faces 521 and 522 are extended toward the center. Further, the rib section 506 has flange sections 523 and 524 that are projected from corresponding longitudinal ends of the rib section 506, and is arranged with the flange sections 523 and 524 contacting side faces of the spacers 503 and 504, respectively, such that positioning in the direction of the optical axis is fixed. Further, a pair of flat springs 513 is provided. One flat spring 513 is inserted between the sheet metal 502 and the spacer 503 and another flat spring 513 is inserted between the sheet metal 502 and the spacer 504. In this way, the toroidal lens 505 is held by pressing forces from the top and the sides. Accordingly, even if there is thermal expansion and contraction, the toroidal lens 505 can freely expand and contract in the longitudinal directions.

Adjustment screws 508 are screwed into tapped holes of the supporting sheet metal 501 at three places with an equal interval between both ends of the supporting sheet metal 501. The adjustment screws 508 contact the upper surface of the rib section 506 of the toroidal lens 505. Flat springs 507 are arranged on the pressing sheet metal 502 and pressure-contact the undersurface of the rib section 506. In this way, the rib section 506 is fixed.

Since the toroidal lens 505 is long and has low rigidity, it tends to be deformed (curvature) by slight stress and small thermal-expansion difference due to ambient temperature distribution change. According to the embodiment described above, the form of the toroidal lens 505 is stably maintained and the linearity of its generatrix is maintained by supporting the toroidal lens 505 at two or more places along the supporting sheet metal 501. The supporting sheet metal 501 includes two parts projecting outside of the toroidal lens 505. One of the two parts is fixed to a fixing section installed on the bottom of a housing, with the direction of sub scanning contacting a receiving face 509 and the direction of the optical axis contacting a contacting face 510, such that the position is fixed, and is energized by a flat spring 514 and supported. To the other part, a stepping motor 515 is arranged. A movable cylinder 517 is formed in the shape of a shaft and is screwed into a feed screw. The tip of the movable cylinder 517 penetrates a projecting section of the pressing sheet metal 502, with the tip contacting a receiving face 512, and with the direction of the optical axis contacting a contacting face 511 such that positioning is fixed like a bridge energized by the flat spring 514. The part to which the stepping motor 515 is fixed is movable in the direction of sub scanning with the rotation of the stepping motor 515.

In this way, the toroidal lens 505 can be moved an amount γ in a plane perpendicular to the optical axis with the receiving face 509 serving as the supporting point according to rotation of the stepping motor 515 in one direction or the other. By the rotational adjustment of the toroidal lens 505 in the direction of sub scanning, the generatrix of the toroidal lens 505 in the direction of sub scanning inclines, the scanning line formed by the image-formation positions of the toroidal lens 505 is at an angle, and the scanning lines between stations are compensated for to become parallel.

Under the present circumstances, according to the present embodiment, the movement of the movable cylinder 517 due to the rotation angle of the stepping motor 515 is determined by the pitch of the feed screw. In order to obtain a higher resolution of inclination compensation, shaft rotation is transmitted to the movable cylinder 517 through a reduction gear 516. Rotation of the stepping motor 515 is transmitted in the sequence of a gear 1 arranged on the shaft, gears 2 and 3 arranged on the reduction gear 516, and a gear 4 arranged on the movable cylinder 517. Accordingly, by slightly differentiating the number of teeth of the gear 1 from the gear 4, the rotation angle of the movable cylinder 517 can be advanced or delayed as required, with reference to the rotation angle of the shaft such that the tip of the movable cylinder 517 can be finely moved. Here, the movable cylinder 517 and the reduction gear 516 are inserted between the sheet metals 501 and 502, and are rotationally supported by corresponding axles.

According to the present embodiment, the inclination compensation mechanism as described above is provided for the toroidal lens of the first, the second, and the third stations such that inclination of the corresponding scanning lines with reference to black (the fourth station) is compensated for. Further, based on an inclination detection result described below, compensation is automatically carried out for each color.

Figure 15:
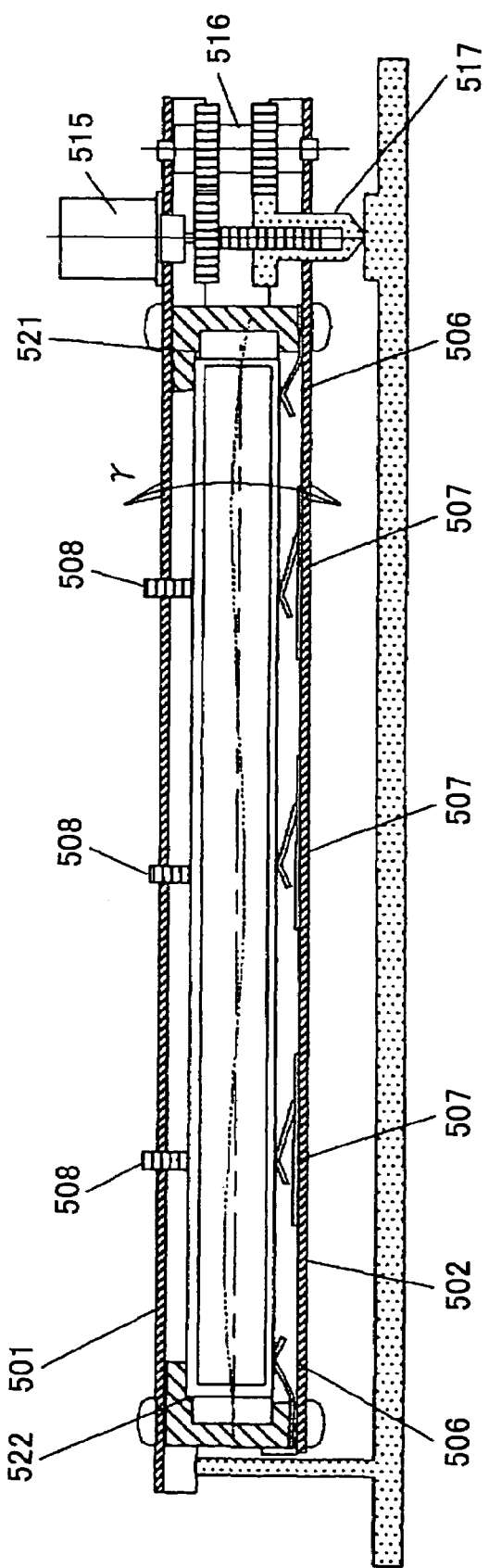
FIG. 15 is a sub scanning cross-sectional diagram showing the structure of the toroidal lens of the optical scanning apparatus according to the embodiment of the present invention.

FIG. 15 shows the toroidal lens viewed in the direction of the optical axis. When amounts of projections of the three adjustment screws 508 are such that they are insufficient with reference to the installation faces 521 and 522, the generatrix of the toroidal lens 505 curves with a convex up. On the contrary, if the amounts of projections are greater with reference to the installation faces 521 and 522, the generatrix curves with the convex being produced downward. In this way, by adjusting the adjustment screws 508, the focal line of the toroidal lens can be curved in the directions of sub scanning, and a bend of the scanning line to a high order component can be compensated for.

Generally, the bend of the scanning line is produced by a combination of an arrangement error of the optical unit that constitutes the optical system, torsion of faces when fabricated, warpage, and the like. The shape of the bend may range from simple forms, such as an upper convex type and a lower convex type, to complicated forms, such as M type, W type, and a sine wave type. As described above, according to the present embodiment, the toroidal lens 505 is incurvated in a direction that cancels the bend by adjusting three points in the direction of main scanning such that each scanning line on the photo conductor drum is made straight. According to the present embodiment, the inclination compensation mechanism is provided to the toroidal lenses, and adjustments are made at the time of assembly so that the form of the curve between the scanning lines of each station may become the same.

Embodiment 4

In the following, an image formation apparatus according to the embodiment of the present invention is described.

Figure 18:
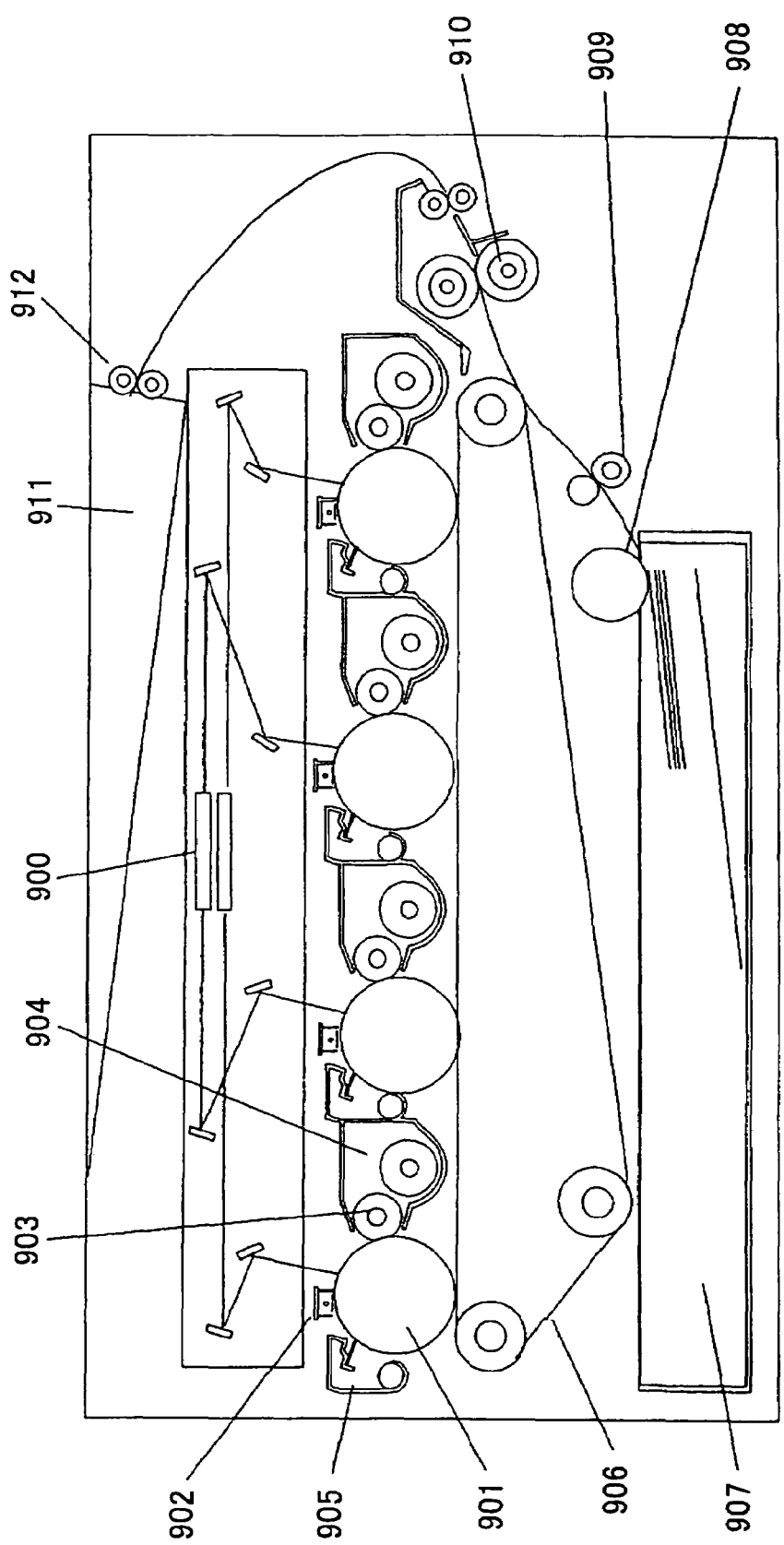
FIG. 18 is a cutaway diagram showing the structure of an image formation apparatus according to the embodiment of the present invention.

FIG. 18 is a schematic diagram showing the outline structure of the image formation apparatus according to the embodiment. The image formation apparatus includes an optical scanning apparatus 900, a photo conductor drum 901, an electrification charger 902, a developing roller 903, a toner cartridge 904, a cleaning case 905, an imprint belt 906, a medium tray 907, a feed roller 908, a registration roller pair 909, a fixing roller 910, a delivery tray 911, and a delivery roller 912. Here, the description is made paying attention to one station; other stations include respective photoconductor drums, electrification chargers, developing rollers, and cleaning cases.

Around the photo conductor drum 901 are arranged the electrification charger 902 for charging the photo conductor at a high voltage, the developing roller 903 for developing an electrostatic latent image formed by the optical scanning apparatus 900 by adhering charged toner, the toner cartridge 904 for supplying the toner to the developing roller, and the cleaning case 905 for removing toner that remains on the drum. As described above, two or more lines, specifically four lines with this embodiment, are simultaneously recorded on the photo conductor drum by every polygon mirror face scanning.

The image formation stations are arranged in the moving direction of the imprint belt 906 so that yellow, magenta, cyan, and black toner images are imprinted one by one, uniting timing, on the imprint belt, and a color image is formed by superposing the toner images. Here, the image formation stations are structured basically the same, the only difference being the toner colors.

The recording medium is supplied by the feed roller 908 from the medium tray 907, and is sent out by the registration roller pair 909 according to the timing of the recording start in the direction of sub scanning. Then, the color image is imprinted from the imprint belt 906 to the recording medium, fixed by the fixing roller 910, and the recording medium is discharged to the delivery tray 911 by the delivery roller 912.

The multi-beam luminous source apparatus according to the embodiment as described above includes the luminous source unit that includes two or more luminous sources monolithically arranged in the direction of main scanning, the coupling lens for converting two or more optical beams from the luminous source unit into a convergence state, and the supporting member for supporting these items in one body. Here, the supporting member includes the first member for supporting and rotationally adjusting the coupling lens centered on the optical axis of the luminous source unit, and the second member for supporting the luminous source unit and for adjusting the inclination of the first member in the main scanning plane. In this way, even if the number of the luminous sources is increased, arrangement of each luminous source with reference to the coupling lens can be precisely performed with ease within realistic limits of chip mounting precision. Thus, the image-formation property of the beam spot on the scanned surface (photo conductor) is made uniform. Accordingly, the image quality is stabilized even if the image writing is started from any one of the luminous sources, and high quality image formation without concentration unevenness and without change in hue can be performed. Further, the yield of the semiconductor laser arrays is improved and production efficiency is improved.

Further, the multi-beam luminous source apparatus according to the embodiment includes the circuit board (the control substrate 313) that is supported by the second member, for mounting the luminous source unit, and for forming at least a part of the driving unit for modulating the luminous sources. In this way, the adjustment described above can be performed while the luminous source unit is mounted on the circuit board. Accordingly, feedback control can be carried out while the luminous sources are turned on, always detecting the convergence state. That is, adjustment jobs are simplified and production efficiency is improved. Further, the convergence of each luminous source can be precisely arranged, and high quality image formation without concentration unevenness and change in hue can be performed.

Further, according to the embodiment, the second member has the contacting face 322 parallel to the array of the luminous sources, positions and fixes the luminous source unit at the contacting face, supports the luminous source unit by pressing the luminous source unit to the contacting face 322 that is parallel to the array of the luminous sources. In this way, even if the temperature changes, relative positions can be maintained. Further, by using a thermally conductive member for the second member, temperatures of all the luminous sources can be held uniform. Accordingly, even when duty rates vary from luminous source to luminous source, the luminescence properties can be maintained and high quality image formation without concentration unevenness and change of hue can be performed.

Further, according to the embodiment, the first member has the reference plane that perpendicularly intersects the optical axis of the coupling lens, and the second member is fixed and held at the reference plane; in this way, the second member that supports the luminous source unit is supported by contacting the reference plane that perpendicularly intersects the optical axis of the coupling lens; accordingly, even if the temperature changes, relative arrangement precision can be maintained.

Further, according to the embodiment, arrangement of the second member can be adjusted with reference to the first member within the reference plane; in this way, even if the array of the luminous sources is inclined, the array center of the luminous source can be put on the optical axis of the coupling lens such that the luminous sources are symmetrically arranged with reference to the optical axis; accordingly, the property of the beam spots on the scanned surface (photo conductor) can be uniformly arranged, and high quality image formation without concentration unevenness and change of hue can be performed.

Further, according to the embodiment, the inclination in the main scanning plane of the first member is adjustable so that the convergence of the optical beams at least from luminescence sources located at the ends in the direction of main scanning out of the luminous sources is achieved. In this way, each luminous source can be properly arranged with reference to the coupling lens without measuring all the luminous sources; thus, control jobs are simplified and production efficiency is improved.

Further, according to the embodiment, the luminous source unit is constituted by arranging the luminous sources at equal intervals in the direction of main scanning. Accordingly, since the luminous sources are aligned with reference to the coupling lens, the interval of the beam spots in the sub scanning direction on the scanned surface (photo conductor) can be linearly changed according to the rotation by rotationally adjusting the first member centered on the optical axis. In this way, adjustment jobs are simplified and production efficiency is improved.

Further, according to the embodiment, the luminous sources of the luminous source unit are arranged in two dimensions, i.e., n luminous sources in the direction of main scanning, and m luminous sources in the direction of sub scanning, where n is greater than m. The number m in the direction of sub scanning is determined such that a pitch deviation in the direction of sub scanning between the scanning lines on the scanned surface (photo conductor) becomes within a tolerance limit. In this way, the image formation property of the beam spots is made uniform, and high quality image formation without concentration unevenness and change of hue can be performed.

Further, according to the embodiment, the multi-beam scanner capable of performing high quality image formation without concentration unevenness and change of hue is provided, wherein the image-formation properties of the beam spots are uniformly arranged even if the number of the luminous sources is increased with improvements in the speed, the multi-beam scanner including the multi-beam luminous source apparatus, the deflection unit for deflecting and scanning the optical beams from the luminous sources, and the image-formation optical system for performing image-formation of the scanned optical beams to the scanned surface.

Further, according to the embodiment, the multi-beam scanner is capable of providing high-speed, low noise, and power saving operations, wherein one face of the polygon mirror scans and forms two or more scanning lines at a decreased number of rotations; and wherein the multi-beam luminous source apparatus is capable of adjusting around the center of the optical axis from the luminous sources such that the interval of the beam spots of the luminous sources in the direction of sub scanning may become an integral multiple of one scanning line pitch corresponding to the recording density.

Further, according to the embodiment, the high-speed, low noise, and power saving image formation apparatus is provided including the optical scanning apparatus according to the embodiment, an image supporting object for forming an electrostatic latent image by the optical beam from two or more luminous sources, a development unit for developing the electrostatic latent image by toner, and an imprint unit for imprinting the developed toner image on the recording medium.

Further, the present invention is not limited to these embodiments, but variations and modifications may be made without departing from the scope of the present invention.

The present application is based on Japanese Priority Application No. 2005-269015 filed on Sep. 15, 2005 with the Japanese Patent Office, the entire contents of which are hereby incorporated by reference.

What is claimed is:

1. A multi-beam luminous source apparatus, comprising:
a luminous source unit that includes a plurality of luminous sources monolithically arranged in a main scanning direction;
a coupling lens configured to convert optical beams emitted from the luminous source unit into a predetermined convergence state; and
a supporting member configured to support the luminous source unit and the coupling lens in one body, the supporting member comprising:
a first member configured to support the coupling lens, the first member being rotatably mounted on the supporting member such that the coupling lens is adjustable about an optical axis of the optical beams emitted from the luminous source unit; and
a second member configured to support the luminous source unit, the first member being tiltably secured to the second member such that an inclination of the first member in a main scanning plane is adjustable relative to the second member, and an inclination of the second member in the main scanning plane is adjustable relative to a reference plane that is perpendicular to the optical axis of the coupling lens.

2. The multi-beam luminous source apparatus as claimed in claim 1,
wherein the second member supports a circuit board, and
wherein the luminous source unit and at least a part of a driving unit configured to modulate the luminous sources of the luminous source unit are mounted on the circuit board.

3. The multi-beam luminous source apparatus as claimed in claim 1,
wherein the second member includes a contacting face that is parallel to an array formed by the luminous sources of the luminous source unit, and
wherein the second member positions and supports the luminous source unit at the contacting face.

4. The multi-beam luminous source apparatus as claimed in claim 1,
wherein the first member includes a reference plane that perpendicularly intersects the optical axis of the coupling lens, and
wherein the first member joins and supports the second member at the reference plane.

5. The multi-beam luminous source apparatus as claimed in claim 4, wherein the second member is adjustably attached to the first member at the reference plane such that an arrangement of the second member relative to the first member is adjustable.

6. The multi-beam luminous source apparatus as claimed in claim 4, wherein the second member is adjustably attached to the first member such that the inclination in the main scanning plane is adjustable so that the optical beams of at least the luminous sources arranged at an end in the direction of main scanning of the luminous sources of the luminous source unit are aligned in the convergence state.

7. The multi-beam luminous source apparatus as claimed in claim 1, wherein the luminous sources of the luminous source unit are arranged at equal intervals in the main scanning direction.

8. The multi-beam luminous source apparatus as claimed in claim 1,
wherein the luminous sources of the luminous source unit are arranged in two dimensions, and
wherein the number of the luminous sources in the main scanning direction is greater than the number of the luminous sources in a sub scanning direction.

9. An optical scanning apparatus, comprising:
the multi-beam luminous source apparatus as claimed in claim 1;
a deflection unit configured to deflect and scan the optical beams from the luminous sources of the luminous source unit in a block; and an image-formation optical system configured to form an image on a scanned surface with the optical beams scanned by the deflection unit.

10. The optical scanning apparatus as claimed in claim 9, wherein the multi-beam luminous source apparatus is configured to make a rotational adjustment around a center of the optical axis of the optical beams emitted from the luminous source unit so that an interval of beam spots in the direction of sub scanning generated by the luminous sources of the luminous source unit is an integral multiple of a scanning line pitch corresponding to recording density.

11. An image formation apparatus, comprising:
the optical scanning apparatus as claimed in claim 9;
an image supporting object configured to form an electrostatic latent image with the optical beams from the luminous sources of the luminous source unit;
a development unit configured to develop the electrostatic latent image formed on the image supporting object with toner; and
an imprinting unit configured to imprint the toner image developed by the development unit onto a recording medium.

12. A multi-beam luminous source apparatus, comprising:
a luminous source unit that includes a plurality of luminous sources monolithically arranged in a main scanning direction;
a coupling lens configured to convert optical beams emitted from the luminous source unit into a predetermined convergence state; and
a supporting member configured to support the luminous source unit and the coupling lens in one body, the supporting member comprising:
means for supporting the coupling lens, the means for supporting the coupling lens being rotatably mounted on the supporting member such that the coupling lens is adjustable about an optical axis of the optical beams emitted from the luminous source unit; and
a means for supporting the luminous source unit, the means for supporting the coupling lens being tiltably secured to the means for supporting the luminous source unit such that an inclination of the means for supporting the coupling lens in a main scanning plane is adjustable relative to the means for supporting the luminous source unit, and an inclination of the means for supporting the luminous source unit in the main scanning plane is adjustable relative to a reference plane that is perpendicular to the optical axis of the coupling lens.

13. The multi-beam luminous source apparatus as claimed in claim 12, wherein the means for supporting the luminous source unit supports a circuit board, and
wherein the luminous source unit and at least a part of a driving unit configured to modulate the luminous sources of the luminous source unit are mounted on the circuit board.

14. The multi-beam luminous source apparatus as claimed in claim 12,
wherein the means for supporting the luminous source unit includes a contacting face that is parallel to an array formed by the luminous sources of the luminous source unit, and
wherein the means for supporting the luminous source unit positions and supports the luminous source unit at the contacting face.

15. The multi-beam luminous source apparatus as claimed in claim 12,
wherein the means for supporting the coupling lens includes a reference plane that perpendicularly intersects the optical axis of the coupling lens, and
wherein the means for supporting the coupling lens joins and supports the means for supporting the luminous source unit at the reference plane.

16. The multi-beam luminous source apparatus as claimed in claim 15, wherein the means for supporting the luminous source unit is adjustably attached to the means for supporting the coupling lens at the reference plane such that an arrangement of the means for supporting the luminous source unit relative to the means for supporting the coupling lens is adjustable.

17. The multi-beam luminous source apparatus as claimed in claim 15, wherein the means for supporting the luminous source unit is adjustably attached to the means for supporting the coupling lens such that the inclination in the main scanning plane is adjustable so that the optical beams of at least the luminous sources arranged at an end in the direction of main scanning of the luminous sources of the luminous source unit are aligned in the convergence state.

18. The multi-beam luminous source apparatus as claimed in claim 12, wherein the luminous sources of the luminous source unit are arranged at equal intervals in the main scanning direction.

19. The multi-beam luminous source apparatus as claimed in claim 12,
wherein the luminous sources of the luminous source unit are arranged in two dimensions, and
wherein the number of the luminous sources in the main scanning direction is greater than the number of the luminous sources in a sub scanning direction.

20. An optical scanning apparatus, comprising:
the multi-beam luminous source apparatus as claimed in claim 12;
a deflection unit configured to deflect and scan the optical beams from the luminous sources of the luminous source unit in a block; and
an image-formation optical system configured to form an image on a scanned surface with the optical beams scanned by the deflection unit.

21. The optical scanning apparatus as claimed in claim 20, wherein the multi-beam luminous source apparatus is configured to make a rotational adjustment around a center of the optical axis of the optical beams emitted from the luminous source unit so that an interval of beam spots in the direction of sub scanning generated by the luminous sources of the luminous source unit is an integral multiple of a scanning line pitch corresponding to recording density.

22. An image formation apparatus, comprising:
the optical scanning apparatus as claimed in claim 20;
an image supporting object configured to form an electrostatic latent image with the optical beams from the luminous sources of the luminous source unit;
a development unit configured to develop the electrostatic latent image formed on the image supporting object with toner; and
an imprinting unit configured to imprint the toner image developed by the development unit onto a recording medium.

* * * * *